United States Patent [19]
Jonza et al.

[11] Patent Number: 6,045,894
[45] Date of Patent: Apr. 4, 2000

[54] CLEAR TO COLORED SECURITY FILM

[75] Inventors: James M. Jonza; Andrew J. Ouderkirk, both of Woodbury; Michael F. Weber, Shoreview, all of Minn.

[73] Assignee: 3M Innovative Properties Company, St. Paul, Minn.

[21] Appl. No.: 09/006,086

[22] Filed: Jan. 13, 1998

[51] Int. Cl.[7] .................................................. B32B 7/02
[52] U.S. Cl. .................... 428/212; 428/141; 428/411.1; 428/500; 428/913
[58] Field of Search .................... 428/411.1, 212, 428/500, 913, 141, 480, 694; 355/51, 60, 66, 57

[56] References Cited

U.S. PATENT DOCUMENTS

| | | | |
|---|---|---|---|
| 3,124,639 | 3/1964 | Kahn | 88/65 |
| 3,576,707 | 4/1971 | Schrenk et al. | 161/164 |
| 3,598,489 | 8/1971 | Thomas | 355/51 |
| 3,610,729 | 10/1971 | Rogers | 350/157 |
| 3,711,176 | 1/1973 | Alfrey, Jr. et al. | 350/1 |
| 3,773,882 | 11/1973 | Schrenk | 264/171 |
| 3,801,429 | 4/1974 | Schrenk et al. | 161/181 |
| 3,858,977 | 1/1975 | Baird et al. | 356/71 |
| 3,860,036 | 1/1975 | Newman, Jr. | 138/45 |
| 3,884,606 | 5/1975 | Schrenk | 425/133.5 |
| 4,446,305 | 5/1984 | Rogers et al. | 528/348 |
| 4,484,797 | 11/1984 | Knop et al. | 350/162 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,526,466 | 7/1985 | Sandercock | 356/71 |
| 4,705,356 | 11/1987 | Berning et al. | 350/166 |
| 4,720,426 | 1/1988 | Englert et al. | 428/344 |
| 4,937,134 | 6/1990 | Schrenk et al. | 428/213 |
| 5,084,351 | 1/1992 | Philips et al. | 428/411.1 |
| 5,089,318 | 2/1992 | Shetty et al. | 428/212 |
| 5,094,788 | 3/1992 | Schrenk et al. | 264/171 |
| 5,094,793 | 3/1992 | Schrenk et al. | 264/171 |
| 5,095,210 | 3/1992 | Wheatley et al. | 250/339 |
| 5,149,578 | 9/1992 | Wheatley et al. | 428/213 |
| 5,188,760 | 2/1993 | Hikmet et al. | 252/299 |
| 5,211,878 | 5/1993 | Reiffenrath et al. | 252/299 |

(List continued on next page.)

FOREIGN PATENT DOCUMENTS

| | | | |
|---|---|---|---|
| WO 95/17303 | 6/1995 | WIPO | B32B 7/02 |
| WO 95/17691 | 6/1995 | WIPO | G02B 5/30 |
| WO 95/17692 | 6/1995 | WIPO | G02B 5/30 |
| WO 95/17699 | 6/1995 | WIPO | G02F 1/1335 |
| WO 95/27919 | 10/1995 | WIPO | G02B 27/28 |
| WO 96/19347 | 6/1996 | WIPO | B32B 7/02 |
| WO 97/01440 | 1/1997 | WIPO | B32B 27/36 |
| WO 97/01726 | 1/1997 | WIPO | F21V 7/00 |
| WO 97/01774 | 1/1997 | WIPO | G02B 1/10 |
| WO 97/32226 | 9/1997 | WIPO | G02B 5/30 |

OTHER PUBLICATIONS

Alfrey, Jr. et al.; "Physical Optics of Iridescent Multilayered Plastic Films"; Polymer Engineering and Science, vol. 9, No. 6; Nov., 1969 pp. 400–404.

Radford et al.; "Reflectivity of Iridescent Coextruded Multilayered Plastic Films"; Polymer Engineering and Science, vol. 13, No. 3; May, 1973 pp. 216–221.

(List continued on next page.)

Primary Examiner—William Krynski
Assistant Examiner—Hong J Xu
Attorney, Agent, or Firm—Peter L. Olson

[57] ABSTRACT

A multilayer film including multiple polymeric layers designed and made to enable the film to reflect light in the near infrared (IR) portion of the visible spectrum. Depending on the amount and range of red light that is reflected, the film of the present invention appears under certain conditions to exhibit a visible color, commonly cyan. The film appears to be substantially clear when viewed against a diffuse white background from approximately a zero degree observation angle, and appears to be cyan when viewed against that background from an observation angle that is greater than a predetermined shift angle.

39 Claims, 16 Drawing Sheets

6,045,894
Page 2

U.S. PATENT DOCUMENTS

| | | | |
|---|---|---|---|
| 5,234,729 | 8/1993 | Wheatley et al. | 428/30 |
| 5,235,443 | 8/1993 | Barnik et al. | 359/37 |
| 5,269,995 | 12/1993 | Ramanathan et al. | 264/171 |
| 5,294,657 | 3/1994 | Melendy et al. | 524/270 |
| 5,316,703 | 5/1994 | Schrenk | 264/1.3 |
| 5,319,478 | 6/1994 | Funfschilling et al. | 359/53 |
| 5,389,324 | 2/1995 | Lewis et al. | 264/171 |
| 5,448,404 | 9/1995 | Schrenk et al. | 359/584 |
| 5,486,935 | 1/1996 | Kalmanash | 359/37 |
| 5,486,949 | 1/1996 | Schrenk et al. | 359/498 |
| 5,612,820 | 3/1997 | Schrenk et al. | 359/498 |
| 5,629,055 | 5/1997 | Revol et al. | 428/1 |
| 5,629,093 | 5/1997 | Bischof et al. | 428/411.1 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/1.34 |
| 5,783,283 | 7/1998 | Klein et al. | 428/141 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |

OTHER PUBLICATIONS

ASTM E1164–94 "Standard Practice for Obtaining Spectrophotometric Data for Object–Color Evaluation".

ASTM E308–96 (replaces E308–95) "Standard Practice for Computing the Colors of Objects by Using the CIE System".

Born & Wolfe; Principles of Optics, Pergamon Press $6^{th}$ Ed 1980 p. 66.

Valasek; "Introduction to Theoretical and Experimental Optics"; John Wiley & Sons, Inc., Copyright 1949 pp.124–128; 199–203.

Rancourt; "Optical Thin Films —Users' Handbook"; Chapter 1—Introduction to Optical Thin Films; McGraw–Hill Publishing Company; Copyright 1987; p. 1–23.

Schrenk et al.; "Nanolayer polymeric optical films"; Jun. 1992 Tappi Journal; pp. 169–174.

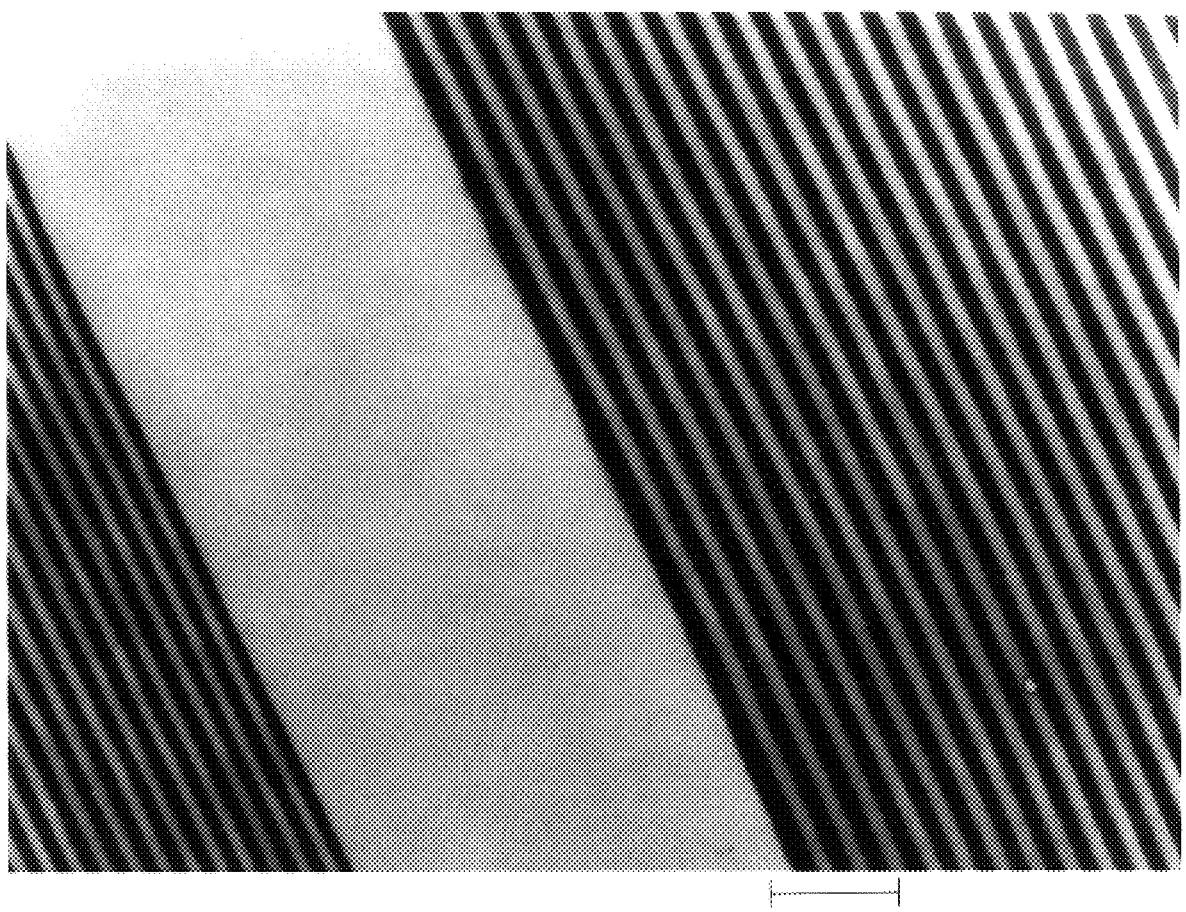
FIG. 18A  1 μm

CLEAR TO COLORED SECURITY FILM

TECHNICAL FIELD

The invention relates to a security film that appears clear when viewed with diffuse white transmitted light at approximately a zero degree observation angle, and which exhibits a visible color, such as cyan, at observation angles exceeding a predetermined shift angle.

BACKGROUND OF THE INVENTION

Counterfeiting is a growing problem. Recent estimates place the total amount of counterfeit goods sold each year at $150–200 billion worldwide, a 20-fold increase since 1970. The counterfeiting problem has become even more serious since the introduction of inexpensive, high quality color copiers, printers and scanners. These devices, some of which were unavailable several years ago, enable counterfeiters to reproduce the packaging and authentication features of many products. Currency has also been subject to counterfeiting using these devices.

Two broad categories of items that are frequently the subject of attempted counterfeiting are documents (including passports, title documents, identification cards, drivers licenses, and currency) and consumer goods. If a document is to be protected from counterfeiting by the use of a security laminate, the laminate typically must be transparent to enable the contents of the document to be seen. The security laminate should also be difficult to copy and tamper evident.

Minnesota Mining and Manufacturing Company of St. Paul, Minn. (3M) has sold a security laminate under the designation CONFIRM™ for twenty years. The product includes a monolayer of glass beads, which by virtue of its placement in the laminate retroreflects incident light. Although the CONFIRM™ product has many advantages over competitive security laminates, it requires the use of a verifier to illuminate the hidden image printed on the back side of the beads. It would be inconvenient, however, for a consumer to have to carry a verifier in order to authenticate money, or a consumer good, for example. In those and other circumstances, faster verification, without the need for a separate verifier, would be desirable.

Aluminized holograms came into considerable use because their authenticity may be verified without a separate verifier, but they have proven to be less secure because counterfeit holograms may be made relatively easily. In the commercial product authentication area, aluminum-backed holograms are becoming more popular, and may be applied to articles by sewing, gluing, molding, or the application of a tag or label. More recently, transparent holograms have gained considerable use as security laminates, because they provide transparency, they may be verified without the use of a separate instrument, and they are comparatively difficult to counterfeit.

An optical effect that has been found difficult to counterfeit is angularly sensitive reflective color filtration. This effect occurs when a layer of material acts as a color filter, reflecting incident light in one wavelength range and transmitting light in another wavelength range, with the wavelength ranges of reflection and transmission varying with changes in the incidence angle of the light. Typically, materials of this sort are made up of many thin layers, each of which is on the order of one quarter of the wavelength of light. These materials, which are referred to as "quarter wave stacks," are formed by the sequential deposition of isotropic materials with different refractive indices. For example, the Bank of Canada incorporates a silica-zirconia 5 layer stack into its currency. Sequential deposition is an expensive process, however, and thus the widespread use of quarter wave stacks for inexpensive consumer goods would also be impractical. To date, no known uses of quarter wave stacks for commercial product authentication have been found.

U.S. Pat. No. 5,149,578 (Wheatley et al.) mentions the use of color shifting films for security applications. However, Wheatley et al. points out that the visual effects of the disclosed films may not be sufficiently dramatic to be reliably perceived by some users, especially those having unusual or reduced color perception. More importantly, a film having an appearance that shifts from one color to another color may not be suitable for application to an item of value such as a document, where printing, graphics, or other indicia must be perceived through the film.

Other angularly sensitive materials, such as those made by Flex Products of Santa Rosa, Calif. for prototype currency for the U.S. Bureau of Engraving and Printing, were found to crack too readily, and were thereafter intentionally made into flakes that were incorporated into security inks. Forty countries have incorporated this type of ink into their currency, but so many colors are being fabricated that there is some confusion as to what colors are intended to represent authentic currency in each country, because there is no standard. Similar color shifting pigments are also being used in paints for commercial products, including automobiles. A disadvantage of these materials is that there does not appear to be any viewing angle at which they are transparent. As a result, when used as authentication layers, they can only be located on the item to be identified in an area which does not contain printed or other matter which is to be seen through the authentication layer.

Angularly sensitive diffraction films are disclosed in U.S. Pat. No. 4,484,797 (Knop et al.), wherein materials having particular combinations of refractive indices are embedded in a structure having other refractive indices, to produce a diffractive color filter which, in one example, changes color from reddish to white, and from reddish to green, when the angle of viewing changes from 0° to 20°. It would appear, however, that the complexity of the disclosed materials would require an expensive manufacturing process to produce a useful article. Moreover, the optical effect produced by these materials would appear to depend not only upon the angle of viewing, but also upon the orientation of the plane of viewing, which may make reliable authentication difficult for an untrained observer.

U.S. Pat. No. 5,089,318 (Shetty et al.) describes an iridescent film with thermoplastic elastomeric components, in which the film after being extruded is said to be brightly iridescent and was green and red when seen by reflection at perpendicular incidence. Films that appear colored at normal incidence, however, can obscure underlying images, which for security purposes can be undesirable.

A highly desirable feature of any authentication layer is that not only should the material itself not be counterfeitable, but that the anticounterfeiting feature of the material also provide within itself some means for incorporating readable or otherwise recognizable characters or other authenticating indicia in the material in a way which cannot easily be counterfeited. Conventional angularly sensitive materials are not believed to provide features of this type.

In light of the disadvantages of known products, it would be desirable to provide a low-cost article useful for the authentication of items of value, and specifically items having information provided thereon which should be viewed through the article.

SUMMARY OF THE INVENTION

The present invention includes a multilayer film comprising alternating layers of at least a first polymer and a second polymer; the film appearing substantially clear at approximately a zero degree observation angle, and colored at at least one observation angle greater than a predetermined shift angle. The color is preferably cyan. Stated in different terms, the invention includes a multilayer film comprising alternating layers of at least a first polymer and a second polymer, the film transmitting substantially all incident visible light at approximately a zero degree observation angle, and transmitting substantially all visible light except a selected portion of the red light at at least one observation angle greater than a predetermined shift angle. In another embodiment, the invention includes a multilayer film comprising alternating layers of at least a first polymer and a second polymer, the film appearing substantially clear at approximately a zero observation angle for light of either polarization state, and appearing colored for one polarization while appearing clear for the other polarization at at least one observation angle greater than a predetermined shift angle. Particular advantages of the invention are described in greater detail below.

BRIEF DESCRIPTION OF THE DRAWINGS

The invention will be described with reference to the drawings, in which like numbers designate like structure throughout the various Figures, and in which:

FIGS. 18A, 18B, and 18C show the effects of embossing on the multilayer film of the present invention.

DETAILED DESCRIPTION OF THE INVENTION

Figure 1:
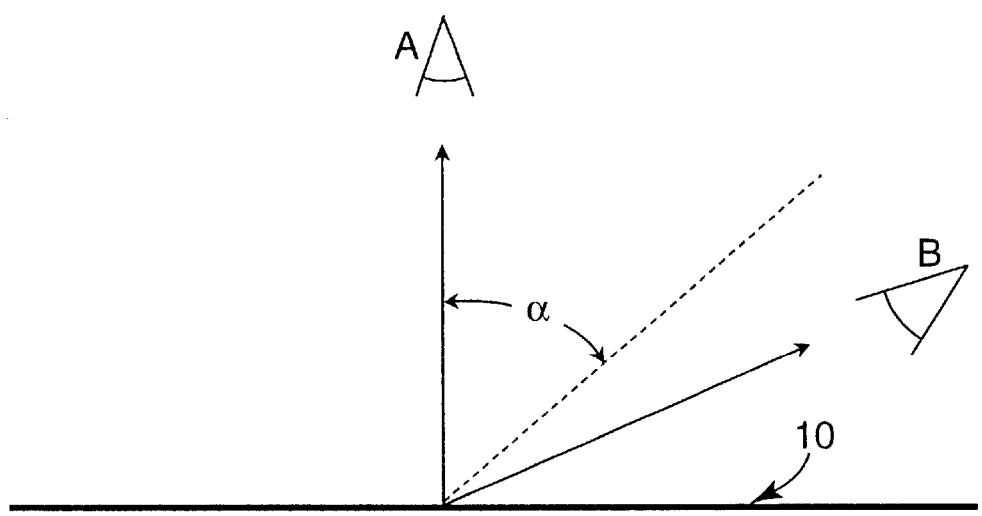
FIG. 1 is a schematic illustration of the effect of the multilayer film of the present invention when viewed by an observer at two points relative to the film.

I. Introduction:

In simplest terms, the multilayer film of the present invention appears to be clear when viewed by an observer at a zero degree observation angle, and to exhibit a visible color when viewed at an observation angle that is greater than a predetermined shift angle. As used herein, the term "clear" means substantially transparent and substantially colorless, and the term "shift angle" means the angle (measured relative to an optical axis extending perpendicular to the film) at which the film first appears colored. The shift angle is shown at $\alpha$ in FIG. 1. For simplicity, the present invention will be described largely in terms of a color shift from clear to cyan. This effect is produced by creating a multilayer film that includes multiple polymeric layers selected to enable the film to reflect light in the near infrared (IR) portion of the visible spectrum at zero degree observation angles, and to reflect red light at angles greater than the shift angle. Depending on the amount and range of red light that is reflected, the film of the present invention appears under certain conditions to exhibit a visible color, commonly cyan. This effect is illustrated in FIG. 1, wherein an observer at A viewing the inventive film at approximately a zero degree observation angle sees through the film 10, whereas an observer at B viewing the film at an observation angle greater than the shift angle $\alpha$ sees a cyan-colored film. The observer at A thus can read information on an item underlying the inventive film, and at B can determine that the film is authentic, and thus that the item underlying the film is also authentic. This effect can be made to occur for light of one or both polarization states.

When provided with an adhesive layer and applied to an item of value, the film is very useful as a means of authentication. It is distinctive, inexpensive, and difficult or impossible to duplicate with ordinary equipment. As a result, providers of items of value, such as boxed electronic equipment, compact discs, driver's licenses, title documents, passports, or branded products may simply apply the multilayer film of this invention to their products and instruct their customers only to accept as authentic items of value so labeled. In addition, because the film is transparent for at least some range of viewing angles, it can be placed over printed indicia, graphics, or other visible features without significantly inhibiting their viewability.

II. Construction, Materials, and Optical Properties:

The construction, materials, and optical properties of conventional multilayer polymeric films are generally known, and were first described in Alfrey et al., *Polymer Engineering and Science,* Vol. 9, No. 6, pp 400–404, November 1969; Radford et al., *Polymer Engineering and Science,* Vol. 13, No. 3, pp 216–221, May 1973; and U.S. Pat. No. 3,610,729 (Rogers). More recently patents and publications including PCT International Publication Number WO 95/17303 (Ouderkirk et al.), PCT International Publication Number WO 96/19347 (Jonza et al.), U.S. Pat. No. 5,095,210 (Wheatley et al.), and U.S. Pat. No. 5,149,578 (Wheatley et al.), discuss useful optical effects which can be achieved with large numbers of alternating thin layers of different polymeric materials that exhibit differing optical properties, in particular different refractive indices in different directions. The contents of all of these references are incorporated by reference herein.

Figure 2:
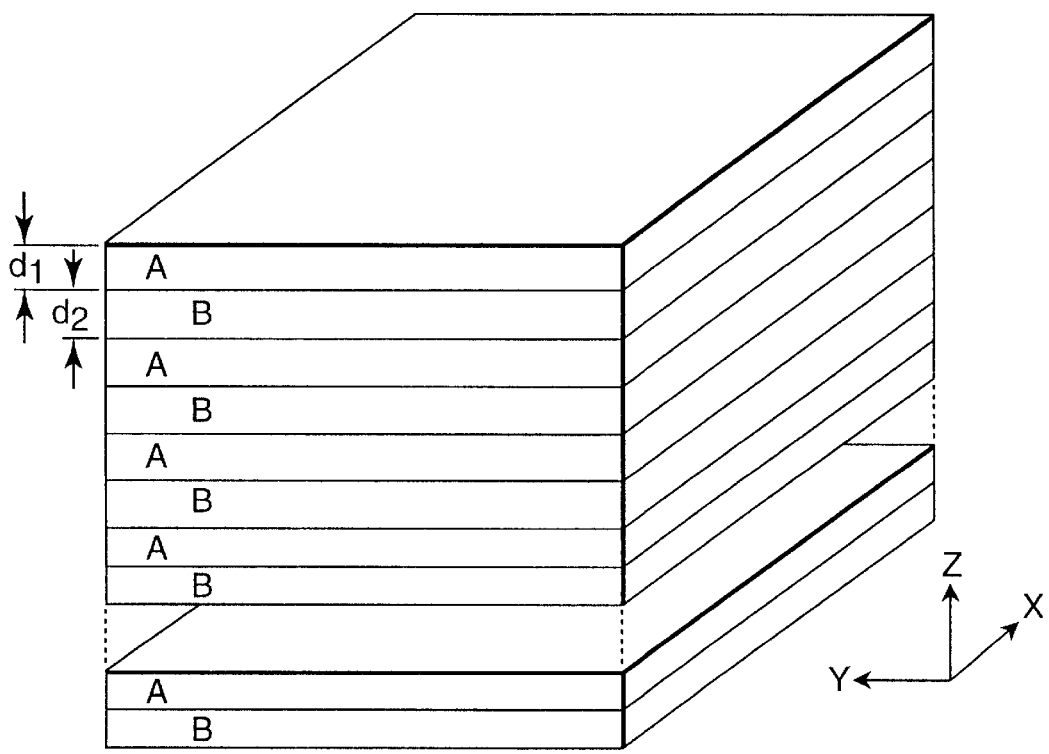
FIG. 2 is a perspective view of a multilayer film according to the present invention.

A. Construction: Multilayer polymeric films can include hundreds or thousands of thin layers, and may contain as many materials as there are layers in the stack. For ease of manufacturing, preferred multilayer films have only a few different materials, and for simplicity those discussed herein typically include only two. FIG. 2, for example, includes a first polymer A having an actual thickness $d_1$, and a second polymer B having an actual thickness $d_2$. The multilayer film includes alternating layers of a first polymeric material having a first index of refraction, and a second polymeric material having a second index of refraction that is different from that of the first material. The individual layers are typically on the order of 0.05 micrometers to 0.45 micrometers thick. As an example, the PCT Publication to Ouderkirk et al. discloses a multilayered polymeric film having alternating layers of crystalline naphthalene dicarboxylic acid polyester and another selected polymer, such as copolyester or copolycarbonate, wherein the layers have a thickness of less than 0.5 micrometers, and wherein the refractive indices of one of the polymers can be as high as 1.9 in one direction and 1.64 in the other direction, thereby providing a birefringent effect which is useful in the polarization of light.

Adjacent pairs of layers (one having a high index of refraction, and the other a low index) preferably have a total optical thickness that is ½ of the wavelength of the light desired to be reflected. For maximum reflectivity the individual layers of a multilayer polymeric film have an optical thickness that is ¼ of the wavelength of the light desired to be reflected, although other ratios of the optical thicknesses within the layer pairs may be chosen for other reasons. These preferred conditions are expressed in Equations 1 and 2, respectively. Note that optical thickness is defined as the refractive index of a material multiplied by the actual thickness of the material, and that unless stated otherwise, all actual thicknesses discussed herein are measured after any orientation or other processing. For biaxially oriented multilayer optical stacks at normal incidence, the following equation applies:

$$\lambda/2 = t_1 + t_2 = n_1 d_1 + n_2 d_2 \qquad \text{Equation 1}$$

$$\lambda/4 = t_1 = t_2 = n_1 d_1 = n_2 d_2 \qquad \text{Equation 2}$$

where $\lambda$=wavelength of maximum light reflection $t_1$=optical thickness of the first layer of material $t_2$=optical thickness of the second layer of material and $n_1$=in-plane refractive index of the first material $n_2$=in-plane refractive index of the second material $d_1$=actual thickness of the first material $d_2$=actual thickness of the second material By creating a multilayer film with layers having different optical thicknesses (for example, in a film having a layer thickness gradient), the film will reflect light of different wavelengths. An important feature of the present invention is the selection of layers having desired optical thicknesses (by selecting the actual layer thicknesses and materials) sufficient to reflect light in the near IR portion of the spectrum. Moreover, because pairs of layers will reflect a predictable bandwidth of light, as described below, individual layer pairs may be designed and made to reflect a given bandwidth of light. Thus, if a large number of properly selected layer pairs are combined, superior reflectance of a desired portion of the near IR spectrum can be achieved, thus producing the clear-to-colored effect of the present invention.

The bandwidth of light desired to be reflected at a zero degree observation angle in accordance with the present invention is from approximately 720 to 900 nanometers. Thus, the layer pairs preferably have optical thicknesses ranging from 360 to 450 nanometers (½ the wavelength of the light desired to be reflected) in order to reflect the near IR light. More preferably, the multilayer film would have individual layers each having an optical thickness ranging from 180 to 225 nanometers (¼ the wavelength of the light desired to be reflected), in order to reflect the near infrared light. Assuming for purposes of illustration that the first layer material has a refractive index of 1.66 (as does biaxially oriented PET), and the second layer material has a refractive index of 1.52 (as does biaxially oriented ECDEL™), and assuming that both layers have the same optical thickness (¼ wavelength), then the actual thicknesses of the first material layers would range from approximately 108 to 135 nanometers, and the actual thicknesses of the second layers would range from approximately 118 to 148 nanometers. The optical properties of multilayer films such as this are discussed in detail below.

The various layers in the film preferably have different optical thicknesses. This is commonly referred to as the layer thickness gradient. A layer thickness gradient is selected to achieve the desired overall bandwidth of reflection. One common layer thickness gradient is a linear one, in which the optical thickness of the thickest layer pairs is a certain percent thicker than the optical thickness of the thinnest layer pairs. For example, a 1.13:1 layer thickness gradient means that the optical thickness of the thickest layer pair (typically adjacent one major surface) is 13% thicker than the optical thickness of the thinnest layer pair (typically adjacent the opposite surface of the film). In other embodiments, the optical thickness of the layers may increase or decrease linearly or otherwise, for example by having layers of monotonically decreasing optical thickness, then of monotonically increasing optical thickness, and then monotonically decreasing optical thickness again from one major surface of the film to the other. This is believed to provide sharper band edges, and thus a sharper or more abrupt transition from clear to colored in the case of the present invention. Other variations include discontinuities in optical thickness between two stacks of layers, curved layer thickness gradients, a reverse thickness gradient, a stack with a reverse thickness gradient with f-ratio deviation, and a stack with a substantially zero thickness gradient. A thorough description of layer thickness profiles for band edge sharpening is included in U.S. application Ser. No. 09/006,085, entitled "Optical Film With Sharpened Bandedge," filed on even date herewith, assigned to the assignee of the present invention, and hereby incorporated by reference.

B. Materials: There are several factors to be considered in choosing the materials for the optical film of the present invention. First, although the optical film may be made with three or more different types of polymers, alternating layers of a first polymer and a second polymer are preferred for manufacturing reasons. Second, one of the two polymers, referred to as the first polymer, must have a stress optical coefficient having a large absolute value. In other words, it must be capable of developing a large birefringence when stretched. Depending on the application, this birefringence may be developed between two orthogonal directions in the plane of the film, between one or more in-plane directions and the direction perpendicular to the film plane, or a combination of these. Third, the first polymer must be capable of maintaining this birefringence after stretching, so that the desired optical properties are imparted to the finished film. Fourth, the other required polymer, referred to as the second polymer, must be chosen so that in the finished film, its refractive index, in at least one direction, differs significantly from the index of refraction of the first polymer in the same direction. Because polymeric materials are dispersive, that is, the refractive indices vary with wavelength, these conditions must be considered in terms of a spectral bandwidth of interest. Absorbance is another consideration. For most applications, it is advantageous for neither the first polymer nor the second polymer to have any absorbance bands within the bandwidth of interest. Thus, all incident light within the bandwidth is either reflected or transmitted. However, for some applications, it may be useful for one or both of the first and second polymer to absorb specific wavelengths, either totally or in part.

Polyethylene 2,6-naphthalate (PEN) is frequently chosen as a first polymer for films of the present invention, for reasons explained in greater detail below. It has a large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. The term "PEN" herein will be understood to include copolymers of PEN meeting these restrictions. In practice, these restrictions impose an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications of the current invention.

When a naphthalene dicarboxylic polyester such as PEN or PBN is chosen as first polymer, there are several approaches which may be taken to the selection of a second polymer. One preferred approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids may be used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Often it is useful to predict the isotropic refractive index of a coPEN second polymer. A volume average of the refractive indices of the monomers to be employed has been found to be a suitable guide. Similar techniques well-known in the art can be used to estimate glass transition temperatures for coPEN second polymers from the glass transitions of the homopolymers of the monomers to be employed.

In addition, polycarbonates having a glass transition temperature compatible with that of PEN and having a refractive index similar to the isotropic refractive index of PEN are also useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (includine polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly(4-methyl)pentene), fluorinated polymers and copolymers (such as polytetrafluoroethylene, polytrifluoroethylene, polyvinylidene fluoride, polyvinyl fluoride, fluorinated ethylene-propylene copolymers, perfluoroalkoxy resins, polychlorotrifluoroethylene, polyethylene-co-trifluoroethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another preferred family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly(aryl styrene)s, poly(styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly(propyl styrene), and poly(butyl styrene). Examples of poly(aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile). The syndiotactic vinyl aromatic copolymers of the present invention may be block copolymers, random copolymers, or alternating copolymers.

The syndiotactic vinyl aromatic polymers and copolymers referred to in this invention generally have syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad. In addition, although there are no particular restrictions regarding the molecular weight of these syndiotactic vinyl aromatic polymers and copolymers, preferably, the weight average molecular weight is greater than 10,000 and less than 1,000,000, and more preferably, greater than 50,000 and less than 800,000.

The syndiotactic vinyl aromatic polymers and copolymers may also be used in the form of polymer blends with, for instance, vinyl aromatic group polymers with atactic structures, vinyl aromatic group polymers with isotactic structures, and any other polymers that are miscible with the vinyl aromatic polymers. For example, polyphenylene ethers show good miscibility with many of the previous described vinyl aromatic group polymers.

When a polarizing film is made using a process with predominantly uniaxial stretching, particularly preferred combinations of polymers for optical layers include PEN/coPEN, PET/coPET, PEN/sPS, PET/sPS, PEN/Eastar™, and PET/Eastar™, where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Co. When a polarizing film is to be made by manipulating the process conditions of a biaxial stretching process, particularly preferred combinations of polymers for optical layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

Particularly preferred combinations of polymers for optical layers in the case of mirrors or color-shifting films include PEN/PMMA, PET/PMMA, PEN/Ecdel™, PET/Ecdel™, PEN/sPS, PET/sPS, PEN/coPET, PEN/PETG, and PEN/THV™, where "PMMA" refers to polymethyl methacrylate, Ecdel™ is a thermoplastic polyester or copolyester (believed to comprise cyclohexanedicarboxylate units, polytetramethylene ether glycol units, and cyclohexanedimethanol units) commercially available from Eastman Chemical Co., "coPET" refers to a copolymer or blend based upon terephthalic acid (as described above), "PETG" refers to a copolymer of PET employing a second glycol (usually cyclohexanedimethanol), and THV™ is a fluoropolymer commercially available from 3M.

For mirror films, a match of the refractive indices of the first polymer and second polymer in the direction normal to the film plane is preferred, because it provides for constant reflectance of p-polarized light with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/Ecdel™ system, in which the analogous indices might be 1.66 and 1.51 for PET, while the isotropic index of Ecdel™ might be 1.52. The crucial property is that the normal-to-plane index for one material must be closer to the in-plane indices of the other material than to its own in-plane indices.

It is sometimes preferred for the multilayer optical films of the current invention to consist of more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited. Each skin layer, which are typically provided as outermost layers for a multilayer optical film or a set of layers comprising an optical film, typically has a physical thickness between 1% and 40%, and preferably between 5% and 20% of the overall physical thickness of the multilayer film.

C. Optical Properties: The reflectance characteristics of multilayer films are determined by several factors, the most important of which for purposes of this discussion are the indices of refraction for each layer of the film stack. In particular, reflectivity depends upon the relationship between the indices of refraction of each material in the x, y, and z directions ($n_x$, $n_y$, $n_z$). Different relationships between the three indices lead to three general categories of materials: isotropic, uniaxially birefringent, and biaxially birefringent. The latter two are important to the optical performance of the present invention.

1. Uniaxially birefringent materials: In a uniaxially birefringent material, two indices (typically along the x and y axes, or $n_x$ and $n_y$) are equal, and different from the third index (typically along the z axis, or $n_z$). The x and y axes are defined as the in-plane axes, in that they represent the plane of a given layer within the multilayer film, and the respective indices $n_x$ and $n_y$ are referred to as the in-plane indices.

One method of creating a uniaxially birefringent system is to biaxially orient (stretch along two axes) a multilayer polymeric film. Biaxial orientation of the multilayer film results in differences between refractive indices of adjoining layers for planes parallel to both axes, resulting in the reflection of light in both planes of polarization. A uniaxially birefringent material can have either positive or negative uniaxial birefringence. Positive uniaxial birefringence occurs when the index of refraction in the z direction ($n_z$) is greater than the in-plane indices ($n_x$ and $n_y$). Negative uniaxial birefringence occurs when the index of refraction in the z direction ($n_z$) is less than the in-plane indices ($n_x$ and $n_y$). It can be shown that when $n_{1z}$ is selected to match $n_{2x}=n_{2y}=n_{2z}$ and the multilayer film is biaxially oriented, there is no Brewster's angle for p-polarized light and thus there is constant reflectivity for all angles of incidence. In other words, properly designed multilayer films that are oriented in two mutually perpendicular in-plane axes reflect an extraordinarily high percentage of incident light, and are highly efficient mirrors. By selecting the layers as previously described to reflect near IR light, the color shifting effect of the film of the present invention may be obtained. This same effect may be achieved by positioning two uniaxially oriented (biaxially oriented) films, discussed below, with their respective orientation axes at 90° to each other.

2. Biaxially birefringent materials: In a biaxially birefringent material, all three indices are different. Biaxially birefringent materials are important to the film of the present invention. A biaxially birefringent system can be made by uniaxially orienting (stretching along one axis) the multilayer polymeric film, such as along the x direction in FIG. 2. A biaxially birefringent multilayer film can be designed to provide high reflectivity for light with its plane of polarization parallel to one axis, for all angles of incidence, and simultaneously have low reflectivity (high transmissivity) for light with its plane of polarization parallel to the other axis at all angles of incidence. As a result, the biaxially birefringent system acts as a polarizer, reflecting light of one polarization and transmitting light of the other polarization. Stated differently, a polarizing film is one that receives incident light of random polarity (light vibrating in planes at random angles), and allows incident light rays of one polarity (vibrating in one plane) to pass through the film, while reflecting incident light rays of the other polarity (vibrating in a plane perpendicular to the first plane). By controlling the three indices of refraction—$n_x$, $n_y$, and $n_z$—the desired polarizing effects can be obtained. If the layers were appropriately designed to reflect light in the near infrared, a clear to colored polarizer is the result. Used alone, this film would appear substantially clear at angles less than the shift angle, and colored (although only about half as intense as the biaxially oriented mirror film) at angles exceeding the shift angle. When viewed through a polarizer, it appears clear to either polarizer orientation at angles below the shift angle. For angles greater than the shift angle, it is deeply colored for the light polarized parallel to the stretch direction and clear for light polarized parallel to the non-stretch direction. It is desirable to have $n_{1x} > n_{2x}$, and $n_{1y}$, approximately equal to $n_{2y}$, and $n_{1z}$ closer to $n_{2x}$ than $n_{1x}$ for efficient reflection of light of only one plane of polarization and desired color shift. Two crossed sheets of biaxially birefringent film would yield a highly efficient mirror, and the films would perform similar to a single uniaxially birefringent film.

A novel way of making multilayer polymeric polarizers using biaxial orientation is described in U.S. application Ser. No. 09/006,455, entitled "An Optical Film and Process for Manufacture Thereof," filed on even date herewith and assigned to the assignee of the present invention. In this approach, two polymers capable of permanent birefringence are drawn sequentially such that in the first draw, the conditions are chosen to produce little birefringence in one of the materials, and considerable birefringence in the other. In the second draw, the second material develops considerable birefringence, sufficient to match the final refractive index of the first material in that direction. Often the first material assumes an in-plane biaxial character after the second draw. An example of a system that produces a good polarizer from biaxial orientation is PEN/PET. In that case, the indices of refraction can be adjusted over a range of values. The following set of values demonstrates the principle: for PEN, $n_{1x}$=1.68, $n_{1y}$=1.82, $n_{1z}$=1.49; for PET $n_{1x}$=1.67, $n_{1y}$=1.56 and $n_{1z}$=1.56, all at 632.8 nm. Copolymers of PEN and PET may also be used. For example, a copolymer comprising approximately 10% PEN subunits and 90% PET subunits by weight may replace the PET homopolymer in the construction. Indices for the copolymer under similar processing are about $n_{1x}$=1.67, $n_{1y}$=1.62, $n_{1z}$=1.52, at 632.8 nm. There is a good match of refractive indices in the x direction, a large difference (for strong reflection) in the y direction, and a small difference in the z direction. This small z index difference minimizes unwanted color leaks at shallow observation angles. The film formed by biaxial orientation is strong in all planar directions, while uniaxially oriented polarizer is prone to splitting. Depending on the security application, either approach has merit.

The foregoing is meant to be exemplary, and it will be understood that combinations of these and other techniques may be employed to achieve the polarizing film goal of index mismatch in one in-plane direction and relative index matching in the orthogonal planar direction.

The clear to colored multilayer film of the present invention reflects red light at angles greater than the shift angle. Because cyan is by definition the subtraction of red light from white light, the film appears cyan. The amount of red light reflected, and thus the degree to which the film appears cyan, depends on the observation angle and the reflected bandwidth. As shown in FIG. 1, the observation angle is measured between the photoreceptor (typically a human eye) and the observation axis perpendicular to the plane of the film. When the observation angle is approximately zero degrees, very little visible light of any color is reflected by the multilayer film, and the film appears clear against a diffuse white background (or black against a black background). When the observation angle exceeds a predetermined shift angle α, a substantial portion of the red light is reflected by the multilayer film, and the film appears cyan against a diffuse white background (or red against a black background). As the observation angle increases toward 90 degrees, more red light is reflected by the multilayer film, and the cyan appears to be even deeper. The foregoing description is based on the observation of the effect of ambient diffuse white light on the film of the present invention, rather than on a collimated beam of light. For the case of a single collimated light source with the film viewed against a diffuse white background, the effect is quite similar, except for the special case where the angle of specular reflectance is the observation angle. When this occurs, for angles greater then the shift angle, red light reaches the photoreceptor. By moving the observation angle slightly away from the angle of specular reflectance, the cyan color is again observed. If a narrow reflectance band is used, red light will transit through the film again at shallow viewing angles (greater than the shift angle and less than 90 degrees). This will give a magenta hue to the film. So a clear film would change to cyan, then magenta as the viewer changes observation angle from 0 to 90 degrees. The reflectance band should be less than 100 nm wide to achieve this effect.

One common description of reflectance bandwidth depends on the relationship between the in-plane indices of refraction of the materials in the stack, as shown by the following equation:

$$\text{Bandwidth} = (4\lambda/\pi) \sin^{-1}[(1-(n_2/n_1))/(1+(n_2/n_1))] \quad \text{Equation 3}$$

Thus, if $n_1$ is close to $n_2$, the reflectance peak is very narrow. For example, in the case of a multilayer film having alternating layers of PET ($n_1$=1.66) and Ecdel ($n_2$=1.52) of the same optical thickness, selected for $\lambda$=750 nm minimum transmission, the breadth or bandwidth of the transmission minimum is about 42 nm. In the case of a multilayer film having alternating layers of PEN ($n_1$=1.75) and PMMA ($n_2$=1.49) under the same conditions, the bandwidth is 77 nm.

The value of the blue shift with angle of incidence in any thin film stack can be derived from the basic wavelength tuning formula for an individual layer, shown as Equation 4, below:

$$\lambda/4 = nd(\cos \theta) \quad \text{Equation 4}$$

where

λ=wavelength tuned to the given layer;

n=index of refraction for the material layer for the given direction and polarization of the light traveling through the layer;

d=actual thickness of the layer; and

θ=angle of incidence measured from perpendicular in that layer.

In an isotropic thin film stack, only the value of (Cos θ) decreases as θ increases. However, in the birefringent films of the present invention, both n and (Cos θ) decrease for p-polarized light as θ increases. When the unit cell includes one or more layers of a negatively birefringent material such as PEN, the p-polarized light senses the low z-index value instead of only the in-plane value of the index, resulting in a reduced effective index of refraction for the negatively birefringent layers. Accordingly, the effective low z-index caused by the presence of negatively birefringent layers in the unit cell creates a secondary blue shift in addition to the blue shift present in an isotropic thin stack. The compounded effects result in a greater blue shift of the spectrum compared to film stacks composed entirely of isotropic materials. The actual blue shift will be determined by the thickness weighted average change in L with angle of incidence for all material layers in the unit cell. Thus, the blue shift can be enhanced or lessened by adjusting the relative thickness of the birefringent layer(s) to the isotropic layer(s) in the unit cell. This will result in changes in the f-ratio, defined below, that must first be considered in the product design. The maximum blue shift in mirrors is attained by using negatively uniaxially birefringent materials in all layers of the stack. The minimum blue shift is attained by using only uniaxially positive birefringent materials in the optical stack. For polarizers, biaxially birefringent materials are used, but for the simple case of light incident along one of the major axes of a birefringent thin film polarizer, the analysis is the same for both uniaxial and biaxial films. For directions between the major axes of a polarizer, the effect is still observable but the analysis is more complex.

Figure 3:
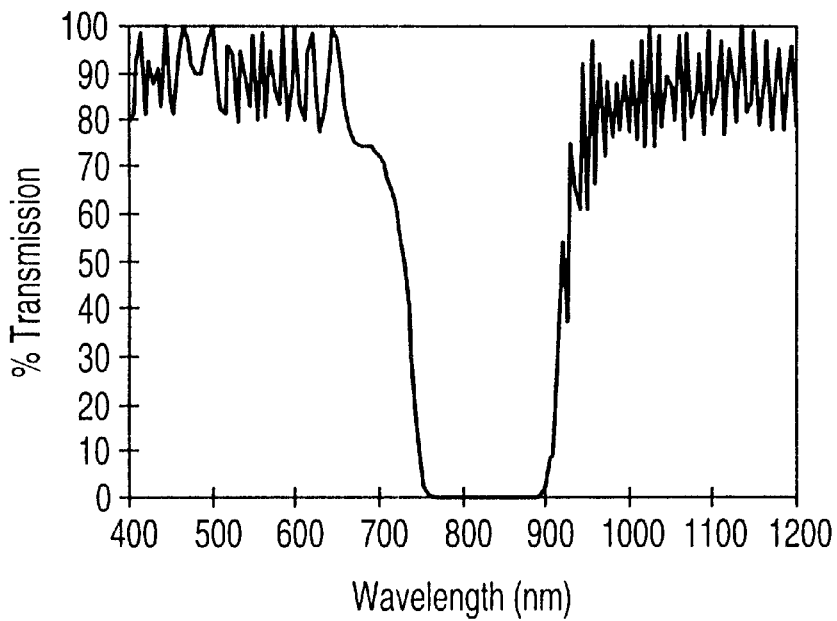
FIGS. 3, 4, 6, 7, 10, 11, and 12 are transmission spectra associated with various modeled film samples.
Figure 4:
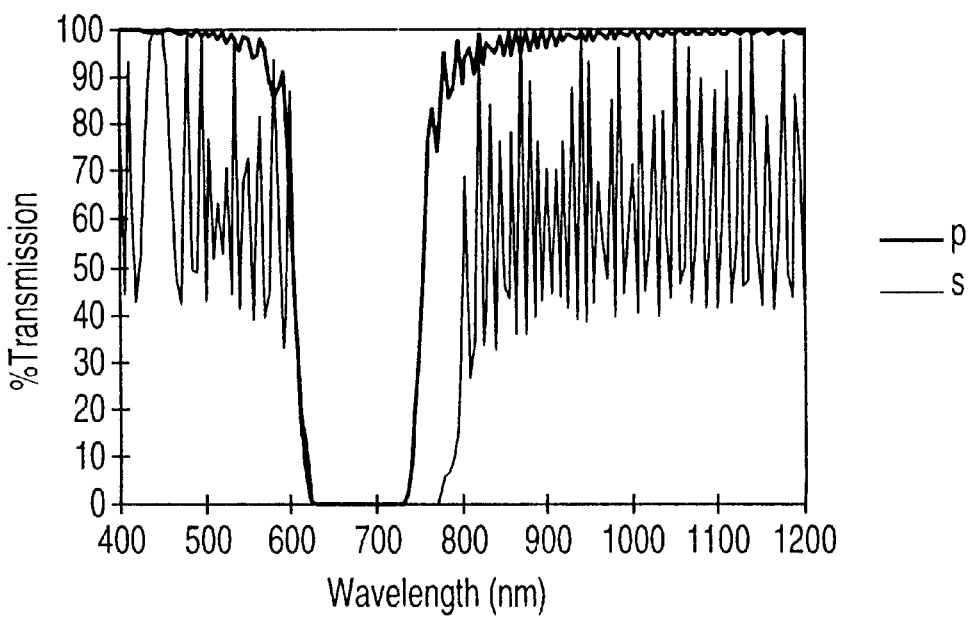

For the uniaxially birefringent case of PEN/PMMA, the angular dependence of the red light reflectance is illustrated in FIGS. 3 and 4. In those graphs, the percent of transmitted light is plotted along the vertical axis, and the wavelengths of light are plotted along the horizontal axis. Note that because the percentage of light transmitted is simply 1 minus the percentage of light reflected (absorption is negligible), information about light transmission also provides information about light reflection. The spectra provided in FIGS. 3 and 4 are taken from a computerized optical modeling system, and actual performance typically corresponds relatively closely with predicted performance. Surface reflections contribute to a decreased transmission in both the computer modeled and measured spectra. In other Examples for which actual samples were tested, a spectrometer available from the Perkin Elmer Corporation of Norwalk, Conn. under the designation Lambda 19 was used to measure optical transmission of light at the angles indicated.

A uniaxially birefringent film having a total of 224 alternating layers of PEN ($n_{x,y}$=1.75; $n_z$=1.5) and PMMA ($n_{x,y,z}$=1.5) with a linear layer thickness gradient of 1.13:1 was modeled. The transmission spectra for this modeled film at a zero degree observation angle is shown in FIG. 3, and the transmission spectra at a 60 degree observation angle is shown in FIG. 4. FIG. 3 shows the virtual extinction of near-IR light, resulting in a film that appears clear to an observer. FIG. 4 shows the virtual extinction of red light, resulting in a film that appears cyan to an observer. Note also that the low (or left) wavelength band edge for both the s- and p-polarized light shift together from about 750 nm to about 600 nm, and transmission is minimized in the desired range of the spectrum so that to the eye, a very sharp color shift is achieved. The concurrent shift of the s- and p-polarized light is a desirable aspect of the present invention, because the color shift is more abrupt and dramatic when light of both polarities shift together. In FIGS. 3 and 4, as well as in later Figures, this effect may be observed by determining whether the left band edges of the s- and p-polarized light spectra are spaced apart or not.

Figure 5:
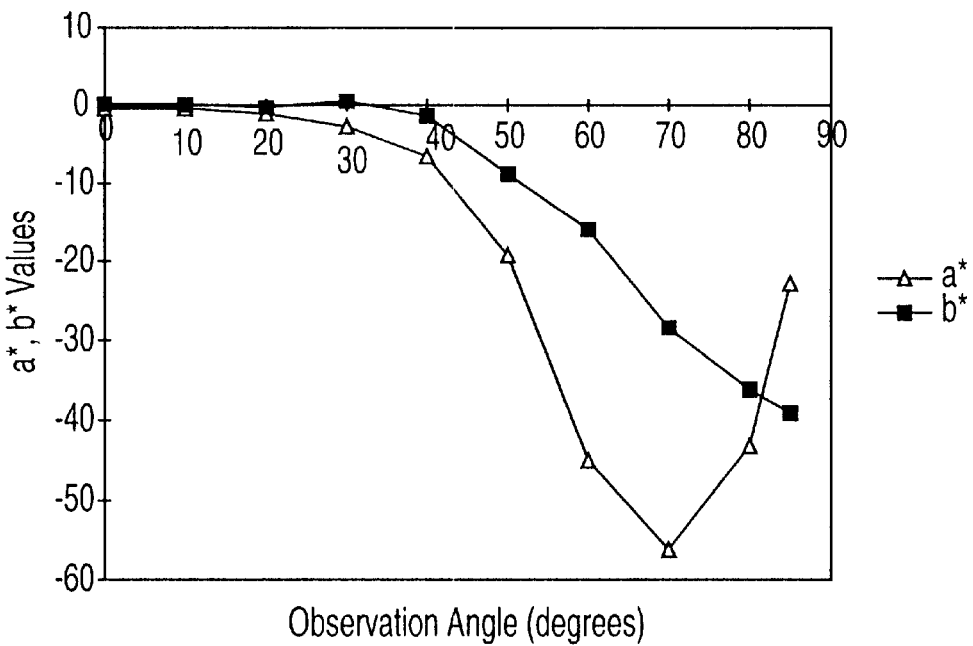
FIGS. 5, 8, and 9 are graphs of CIE L*a*b color coordinates at various observation angles.

To determine the actual color of the film modeled above, the CIE color coordinates in L*a*b color space were determined for transmitted light and a* and b* were plotted as a function of observation angle in FIG. 5. The color calculation method followed ASTM E308-95 "Standard Practice for Computing the Colors of Objects by Using the CIE System". For the CIE calculations on actual spectra, the data was generated following method ASTM E1164-94 "Standard Practice for Obtaining Spectrophotometric Data for Object-Color Evaluation. Illuminant D65 with a 10 degree supplementary standard observer is used for all CIE color measurements. The transmission spectra for the films are used in throughout, although our modeling shows slight differences when CIE coordinates are calculated as two transmissions and a reflection from a white diffuse background. In CIE color coordinates, positive a* corresponds to red, negative a* to green, positive b* to yellow and negative b* to blue color. A*=b*=0 is totally colorless. The colorless condition in Yxy color space is x=0.3127 and y=0.3290. In practice, when the absolute values of a*, b*<1, the human eye cannot perceive any color, and when the absolute values of a*, b*<5, the films of this invention are substantially colorless. Note in FIG. 5 that beyond the shift angle (about 36 degrees), a dramatic change from essentially colorless to a deep cyan occurs. The a* shifts to values lower than −40 and b* achieves values lower than −30 at observation angles of 72 degrees and beyond.

Figure 6:
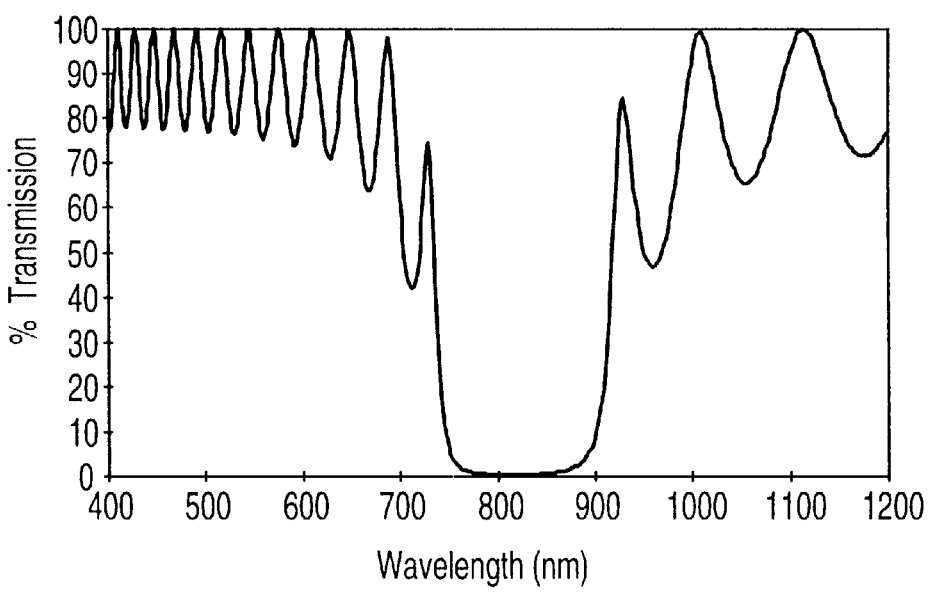
Figure 7:
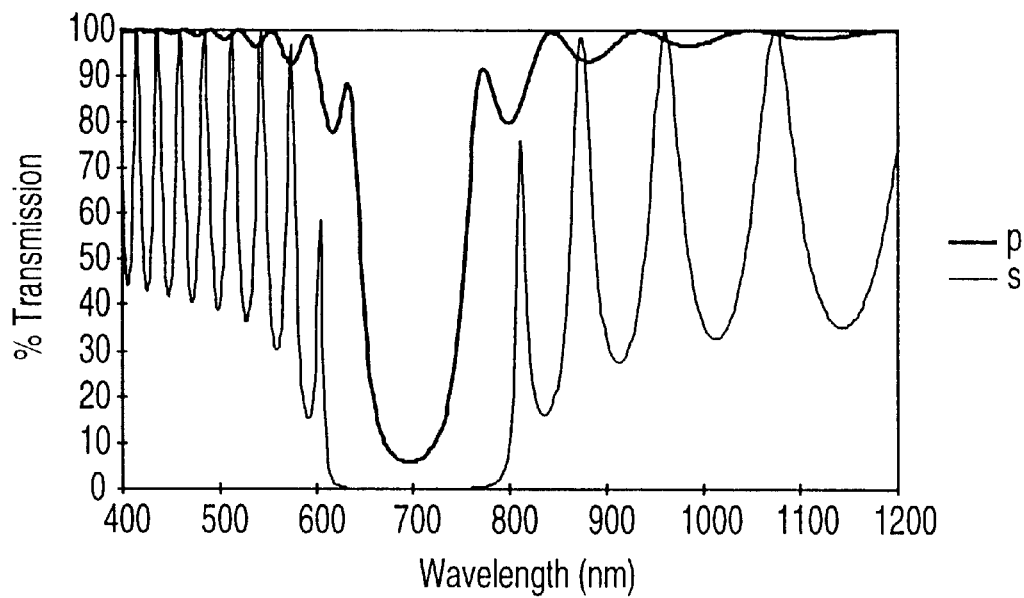
Figure 8:
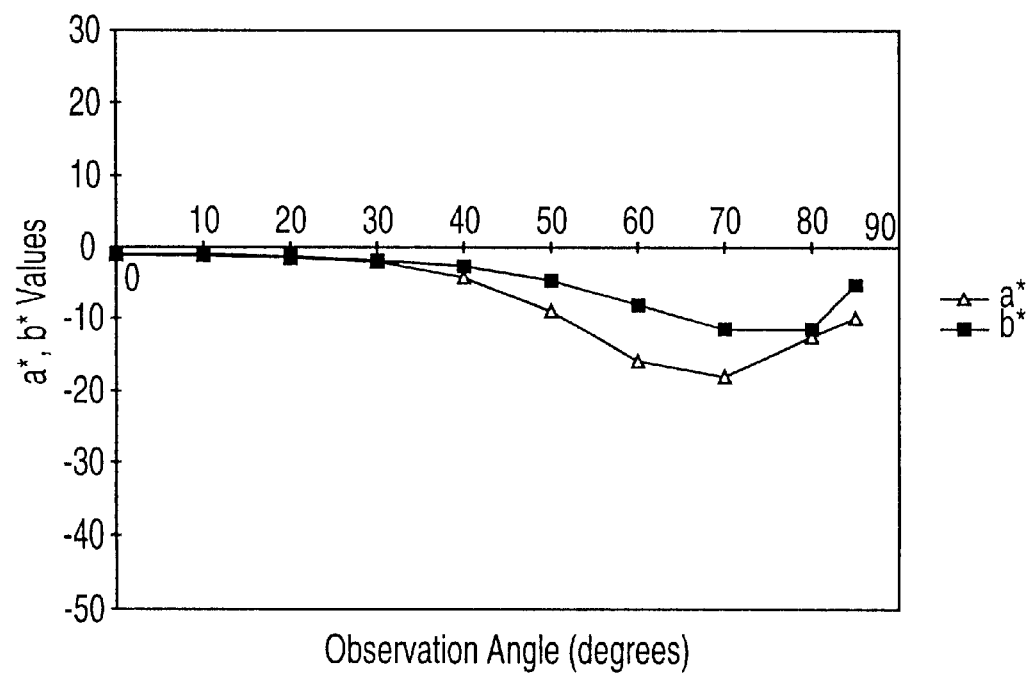

The present invention stands in contrast to the case of isotropic materials. For example, a 24 layer construction of zirconia and silica were modeled. The refractive index of zirconia was $n_{x,y,z}$=1.93, the refractive index of silica was $n_{x,y,z}$=1.45, and the model assumed a linear layer thickness gradient in which the thickest layer pair was 1.08 times thicker than the thinnest layer pair. At a zero degree observation angle, the isotropic film's spectra looked similar to the modeled multilayer film above (compare FIG. 6 to FIG. 3), and to the naked eye, both would be clear. As shown in FIG. 7, however, the low wavelength band edge for p-polarized light viewed at a 60 degree observation angle shifts by about 100 nm, while that for s-polarized light shifts by about 150 nm. This construction does not exhibit an abrupt change from clear to cyan because the s- and p-polarized light do not shift together with change in angle. Furthermore, the p-polarized light transmission spectrum shows some red light leakage, making for weaker cyan color saturation. The CIE color coordinates graphed in FIG. 8 for this modeled isotropic construction bear this out. The a* and b* values at the point of strongest coloration (an observation angle of about 70 degrees) only lie between about −10 and −20.

Figure 9:
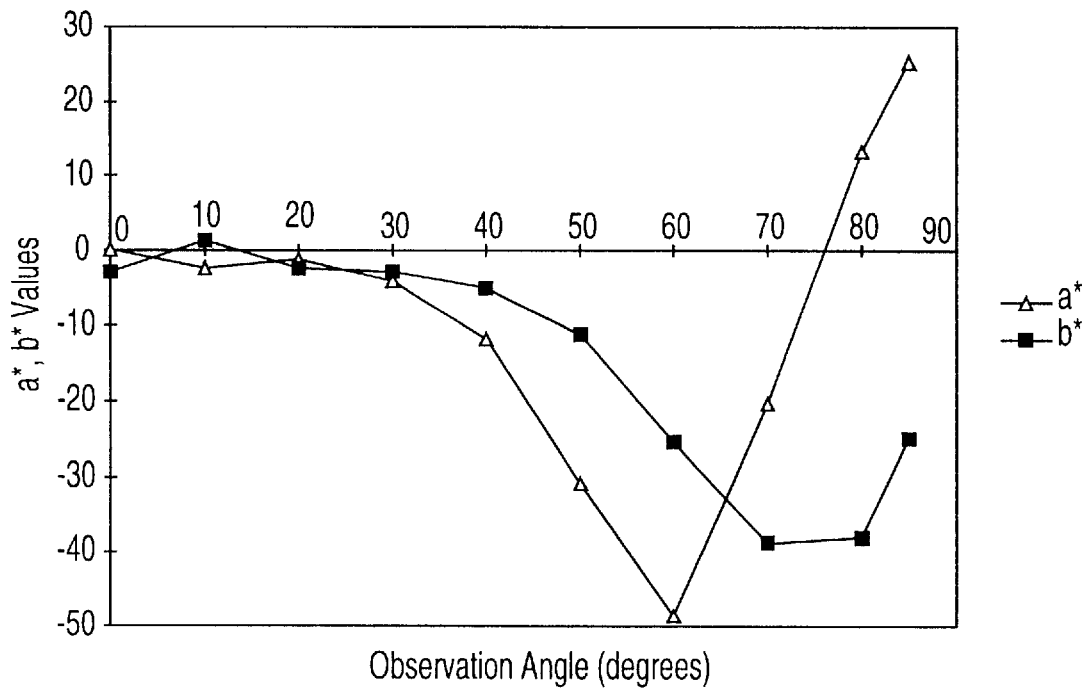
Figure 10:
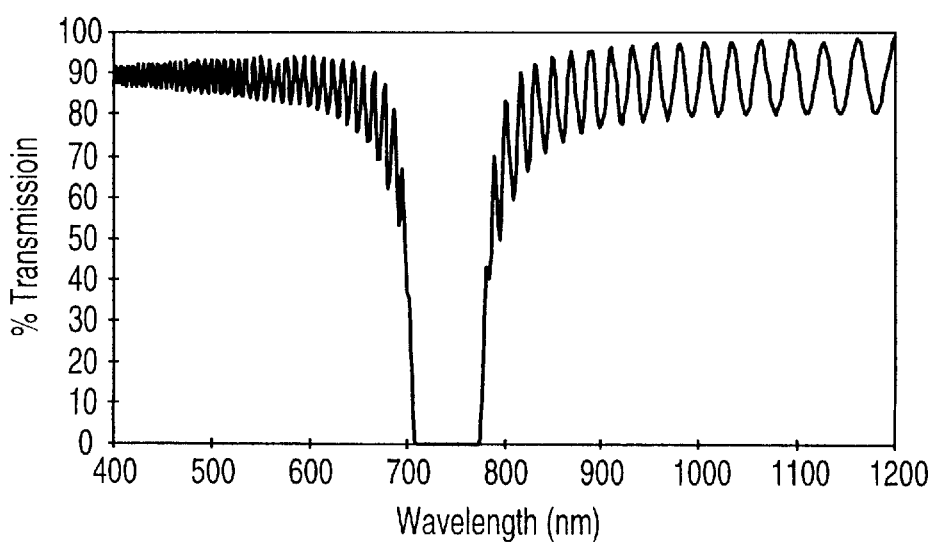
Figure 11:
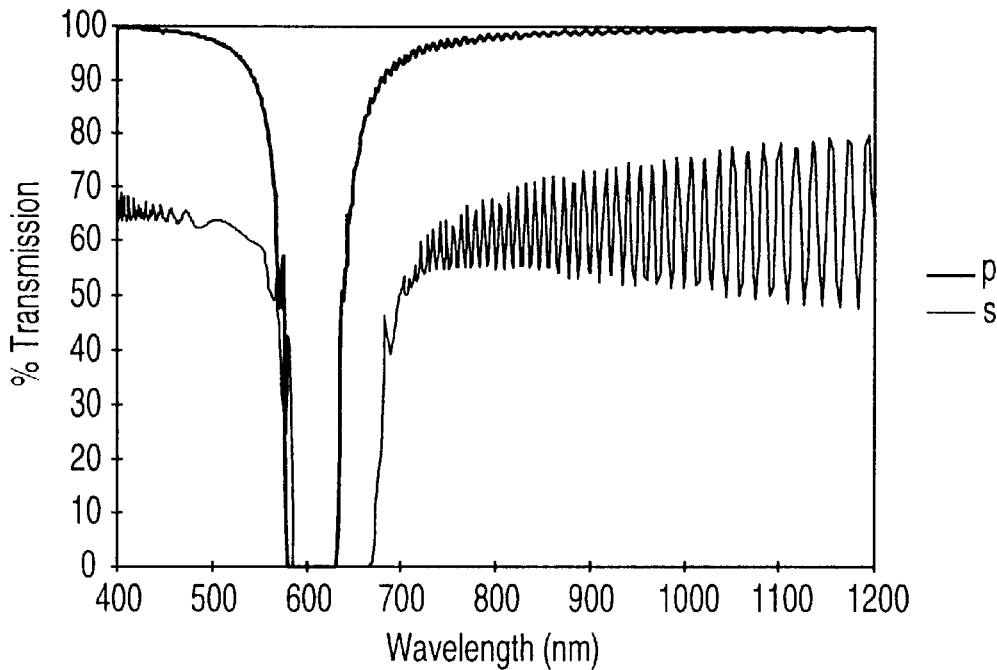
Figure 12:
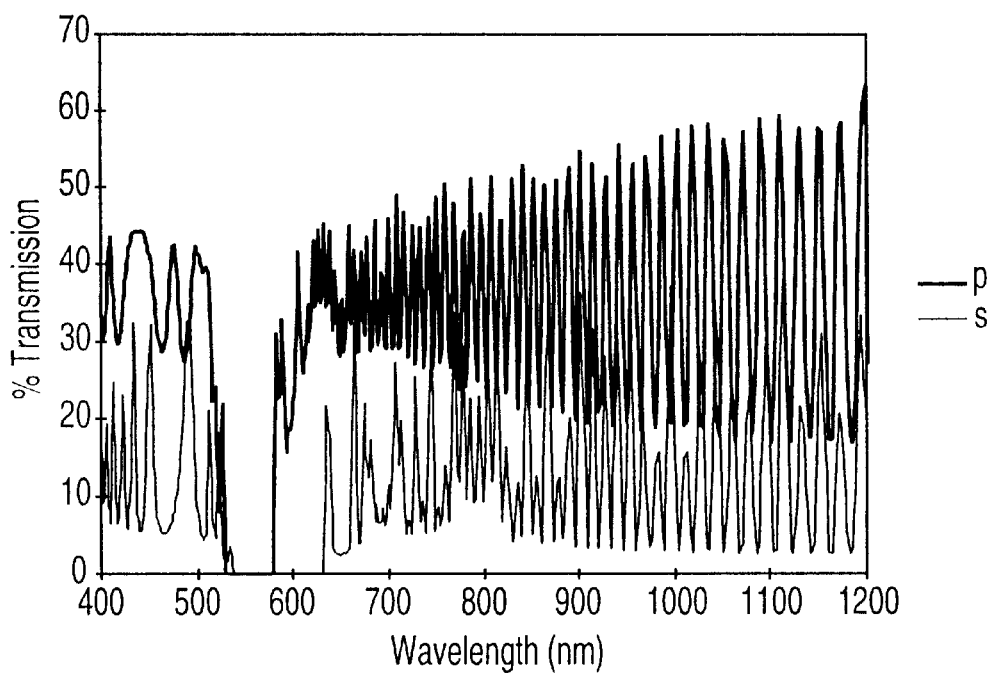

It is also possible with the films of this invention to produce a film that appears to change color from clear to cyan to magenta. A 100 layer film was modeled using PEN and PMMA. The refractive indices employed in the model are $n_{x,y}$=1.75 and $n_z$=1.50 for PEN and $n_{x,y,z}$=1.50 for PMMA. Constant values of the refractive indices ere used across the modeled spectrum from 350 to 1200 nm. The actual layer thickness was chosen to be 123.3 nm for PMMA and 105.7 nm for PEN, corresponding to a quarter wave stack centered at 740 nm. No layer thickness errors were employed in the model. The CIE color coordinates under transmitted light were determined for observation angles ranging from 0 to 85 degrees, and are shown in FIG. 9. The film appears clear at observation angles of less than about 30 degrees, then cyan (negative a* and negative b*) at observation angles of from about 40 to 70 degrees, and finally magenta (positive a* and negative b*) at observation angles of greater than 80 degrees. The corresponding spectra for this modeled construction are shown in FIGS. 10 through 12. The film appears clear in transmission at a zero degree observation angle (FIG. 10), because only near-IR light is reflected. At a 60 degree observation angle (FIG. 11), the film appears cyan because red light is reflected. At an 85 degree observation angle (FIG. 12), the transmission trough has shifted far enough to the left to allow roughly equal amounts of red and blue light to be transmitted, and the film appears magenta.

Shift angles of between 15 and 75 degrees are preferred, because if the shift angle is smaller that 15 degrees, the observer must carefully position the article to which the multilayer film is attached to obtain the clear appearance and perceive the underlying information. If the shift angle is larger than 75 degrees, the observer may not properly position the article to perceive the color shift, and thus may falsely perceive the article to be a counterfeit when it is not. Shift angles of between 30 and 60 degrees are most preferred. The shift angle of a given multilayer film may be selected by designing the layer thicknesses so that a sufficient amount of red light is reflected to render the film cyan in appearance. The appropriate layer thicknesses may be estimated in accordance with Equations 1, 2 and 3 above, which relate the optical thickness (and therefore actual thickness) of the layers to the wavelengths of light desired to be reflected. The bandwidth for a given pair of materials may be estimated from Equation 3, multiplying by the layer thickness ratio. The center of the reflectance band is calculated from Equations 1 or 2 so that it is positioned approximately one half bandwidth from the desired location of the lower band edge.

The shift angle may be defined as the angle when a* first reaches a value of −5 on the CIE L*a*b color space. This also corresponds with the first angle where a noticeable amount of red light is reflected. As seen in FIGS. 3 and 5 compared to FIGS. 9 and 10, placing the transmission trough (reflectance peak) closer to the edge of the visible spectrum (700 nm) changes the shift angle from about 36 degrees to about 32 degrees. When this definition of shift angle is used, the lower band edges for s- and p-polarized light occur at about 660 nm for the PEN/PMMA modeled spectra. In the case of the modeled isotropic zirconia/silica construction, the shift angle occurs at 42° and the band edges fall at 650 nm for p-polarized light and 670 nm for s-polarized light.

To obtain the sharpest transition from clear to colored in appearance, the lower (or left) band edges for both s- and p-polarized light should be coincident. It is believed that one way to design a multilayer film in which those band edges are coincident is to choose materials with an f-ratio of approximately 0.25. The f-ratio, usually used to describe the f-ratio of the birefringent layer, is calculated as shown in Equation 5:

$$\text{f-ratio} = n_1 d_1 / (n_1 d_1 + n_2 d_2) \quad \text{Equation 5}$$

where n and d are the refractive index and the actual thickness of the layers, respectively.

Figure 13:
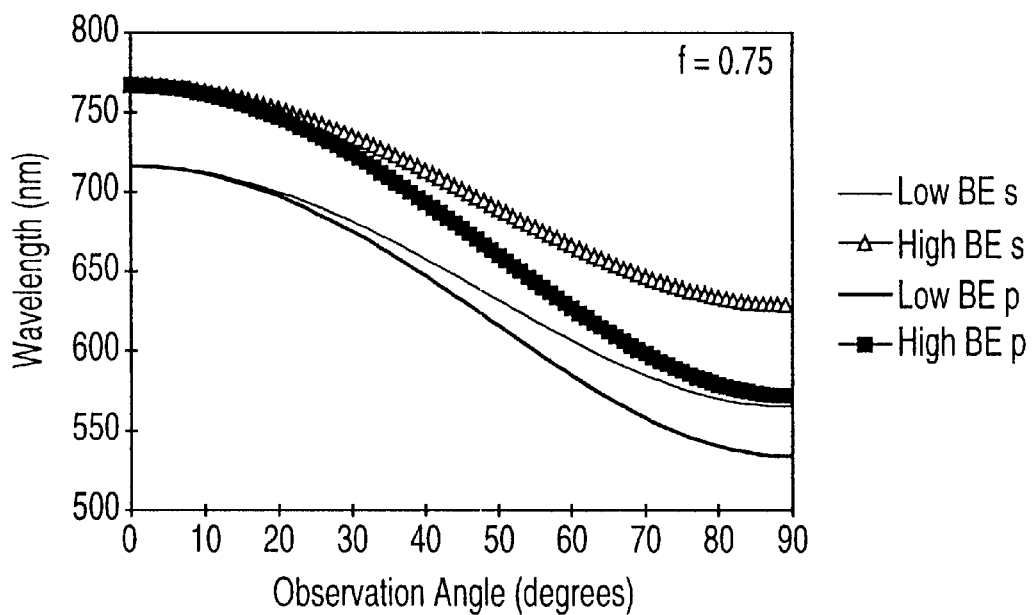
FIGS. 13, 14, and 15 are graphical representations of the relationship between band edge and observation angle.
Figure 14:
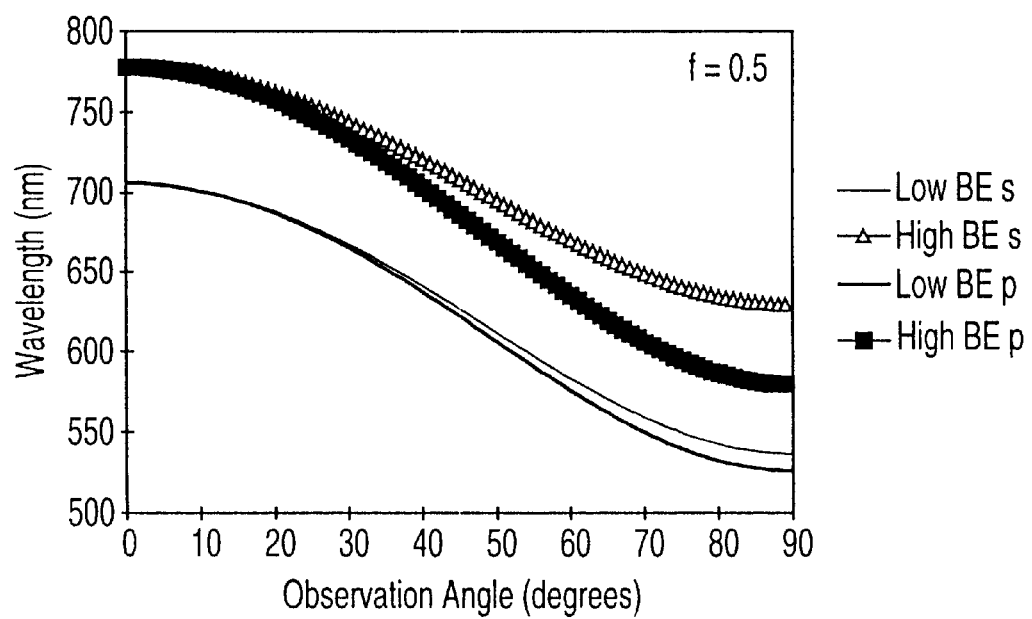
Figure 15:
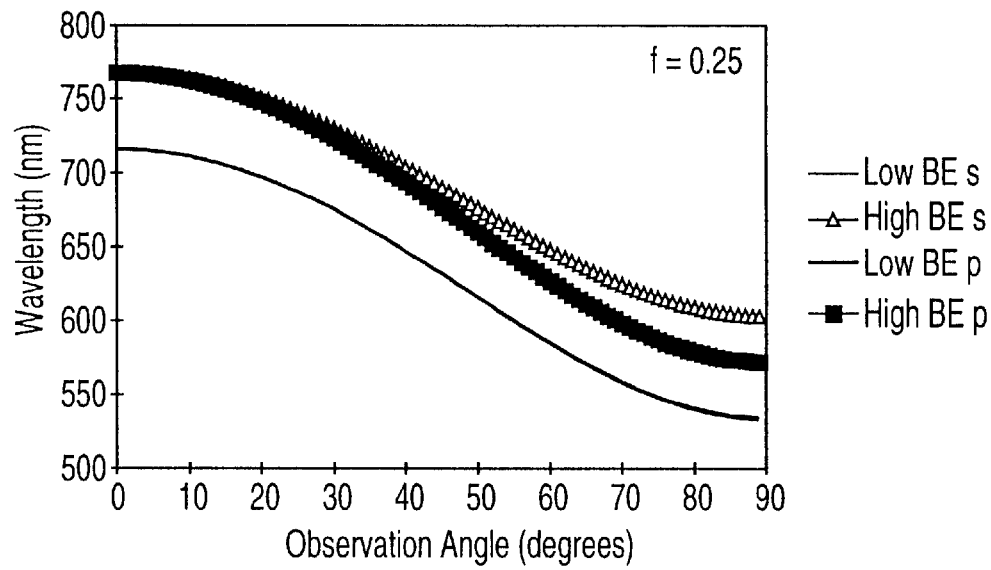

The 100 layer PEN/PMMA modeled case described above, and the subject of FIGS. 9 through 12, was used to demonstrate the effect of changing the f-ratio. PEN is the first material in equation 5; PMMA is the second material. When the f-ratio of the birefringent layer is approximately 0.75, there is a significant separation between the lower band edges of the s- and p-polarized light spectra, as shown in FIG. 13. When the f-ratio is approximately 0.5, there remains a noticeable separation, as shown in FIG. 14. At an f-ratio of 0.25, however, the lower band edges of the s- and p-polarized light spectra are virtually coincident as shown in FIG. 15, resulting in a film having a sharp color transition. Stated in different terms, it is most desirable to have the lower band edges of the s- and p-polarized light spectra within approximately 20 nm of each other, and more desirable to have them within approximately 10 nm of each other, to obtain the desired effect. For the modeled cases that are the subject of FIGS. 3 through 12, an f-ratio of 0.5 was used.

Figure 16:
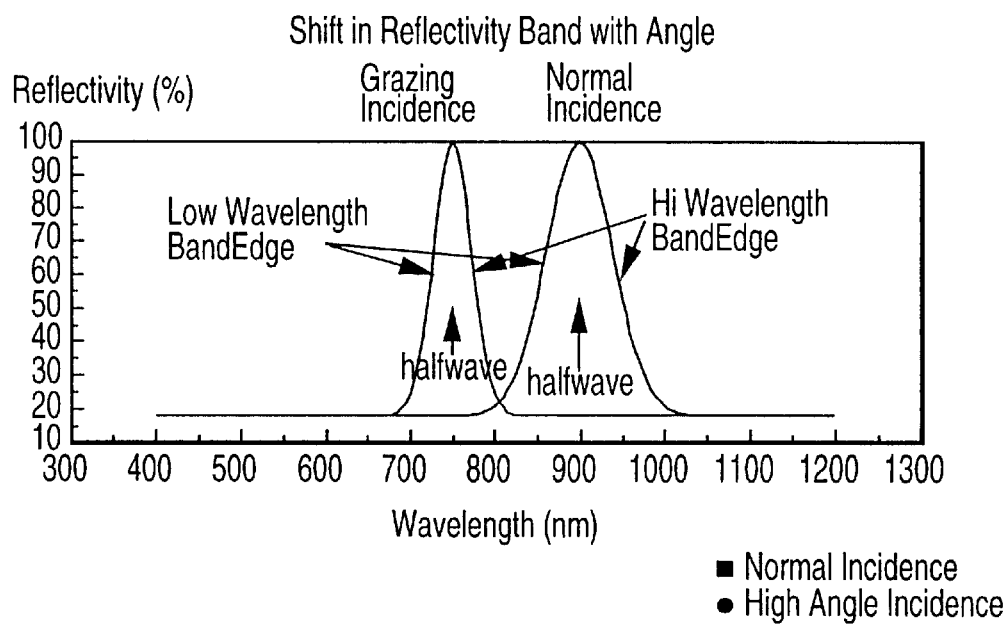
FIG. 16 is a transmission spectrum showing a color shift with change in angle.

The optical theory underlying the modeled data described above will now be described in greater detail. A dielectric reflector is composed of layer groups that have two or more layers of alternating high and low index of refraction. Each group has a halfwave optical thickness that determines the wavelength of the reflection band. Typically, many sets of halfwaves are used to build a stack that has reflective power over a range of wavelengths. Most stack designs have sharp reflectivity decreases at higher and lower wavelengths, know as bandedges. The edge above the halfwave position is the high wavelength band edge, $\lambda_{BEhi}$, and the one below is the low wavelength band edge, $\lambda_{BElo}$. These are illustrated in FIG. 16. The center, edges, and width of a reflection band change with incidence angle.

The reflecting band can be exactly calculated by using a characteristic matrix method. The characteristic matrix relates the electric field at one interface to that at the next. It has terms for each interface and each layer thickness. By using effective indicies for interface and phase terms, both anisotropic and isotropic materials can be evaluated. The characteristic matrix for the halfwave is the product of the matrix for each layer of the halfwave. The characteristic matrix for each layer is given by Equation 6:

$$M_i = \begin{bmatrix} M_{11} & M_{12} \\ M_{21} & M_{22} \end{bmatrix} = \begin{bmatrix} \dfrac{\exp[\beta_i]}{t_i} & \dfrac{r_i \exp[\beta_i]}{t_i} \\ \dfrac{r_i \exp[-\beta_i]}{t_i} & \dfrac{\exp[\beta_i]}{t_i} \end{bmatrix} \quad \text{Equation 6:}$$

where $r_i$ and $t_i$ are the Fresnel coefficients for the interface reflection of the $i^{th}$ interface, and $\beta_i$ is the phase thickness of the $i^{th}$ layer.

The characteristic matrix of the entire stack is the product of the matrix for each layer. Other useful results, such as the total transmission and reflection of the stack, can be derived from the characteristic matrix. The Fresnel coefficients for the $i^{th}$ interface are given by Equations 7(a) and 7(b):

$$r_i = \frac{n_i - n_{i-1}}{n_i + n_{i-1}} \text{ and } t_i = \frac{2n_i}{n_i + n_{i-1}} \quad \text{Equations 7(a); 7(b):}$$

The effective indicies used for the Fresnel coefficients are given by Equations 8(a) and 8(b):

$$n_{is} = \frac{\sqrt{n_{ix}^2 - n_o^2 \sin^2 \theta_o}}{\cos \theta_o} \text{ (for s polarized light and)} \quad \text{Equation 8(a):}$$

$$n_{ip} = \frac{n_{ix} n_{iz} \cos \theta_o}{\sqrt{n_{iz}^2 - n_o^2 \sin^2 \theta_o}} \text{ (for p polarized light.)} \quad \text{Equation 8(b):}$$

When these indicies are used, then the Fresnel coefficients are evaluated at normal incidence. The incident material has an index of $n_o$ and an angle of $\theta_o$.

The total phase change of a halfwave pair, one or both may have anisotropic indicies. Analytical expressions for the effective refractive index were used. The phase change is different for s and p polarization. For each polarization, the phase change for a double transversal of layer i, $\beta$, is shown in Equations 9(a) and 9(b):

$$\beta_{is} = \frac{2\pi d_i}{\lambda} \sqrt{n_{ix}^2 - n_o^2 \sin^2 \theta_o} \text{ (for s polarized light),} \quad \text{Equation 9(a):}$$

$$\beta_{ip} = \frac{2\pi d_i}{\lambda} \frac{n_{ix}}{n_{iz}} \sqrt{n_{iz}^2 - n_o^2 \sin^2 \theta_o} \text{ (for p polarized light),} \quad \text{Equation 9(b):}$$

where $\theta_o$ and $n_o$ are the angle and index of the incident medium.

Born & Wolf, in *Principles of Optics,* Pergamon Press 6th ed, 1980, p. 66, showed that the wavelength edge of the high reflectance region can be determined by evaluating the $M_{11}$ and $M_{22}$ elements of the characteristic matrix of the stack at different wavelengths. At wavelengths where Equation 10 is satisfied, the transmission exponentially decreases as more halfwaves are added to the stack.

$$\left|\frac{M_{11} + M_{22}}{2}\right| \geq 1 \quad \text{Equation 10:}$$

The wavelength where this expression equals 1 is the band edge. For a halfwave composed of two layers, multiplying the matrix results in the analytical expression given in Equation 11.

$$\left|\frac{M_{11} + M_{22}}{2}\right| =$$

$$\left|\cos(\beta_1)\cos(\beta_2) - \frac{1}{2}\left(\frac{n_{hi}}{n_{lo}} + \frac{n_{lo}}{n_{hi}}\right)\sin(\beta_1)\sin(\beta_2)\right| \geq 1 \quad \text{Equation 11:}$$

The edge of a reflection band can be determined from the characteristic matrix for each halfwave. For a halfwave with more than two layers, the characteristic matrix for the stack can be derived by matrix multiplication of the component layers to generate the total matrix at any wavelength. A band edge is defined by wavelengths where Equation 11 is satisfied. This can be either the first order reflection band or higher order reflections. For each band, there are two solutions. There are additional solutions at shorter wavelengths where higher order reflections can be found.

Figure 17:
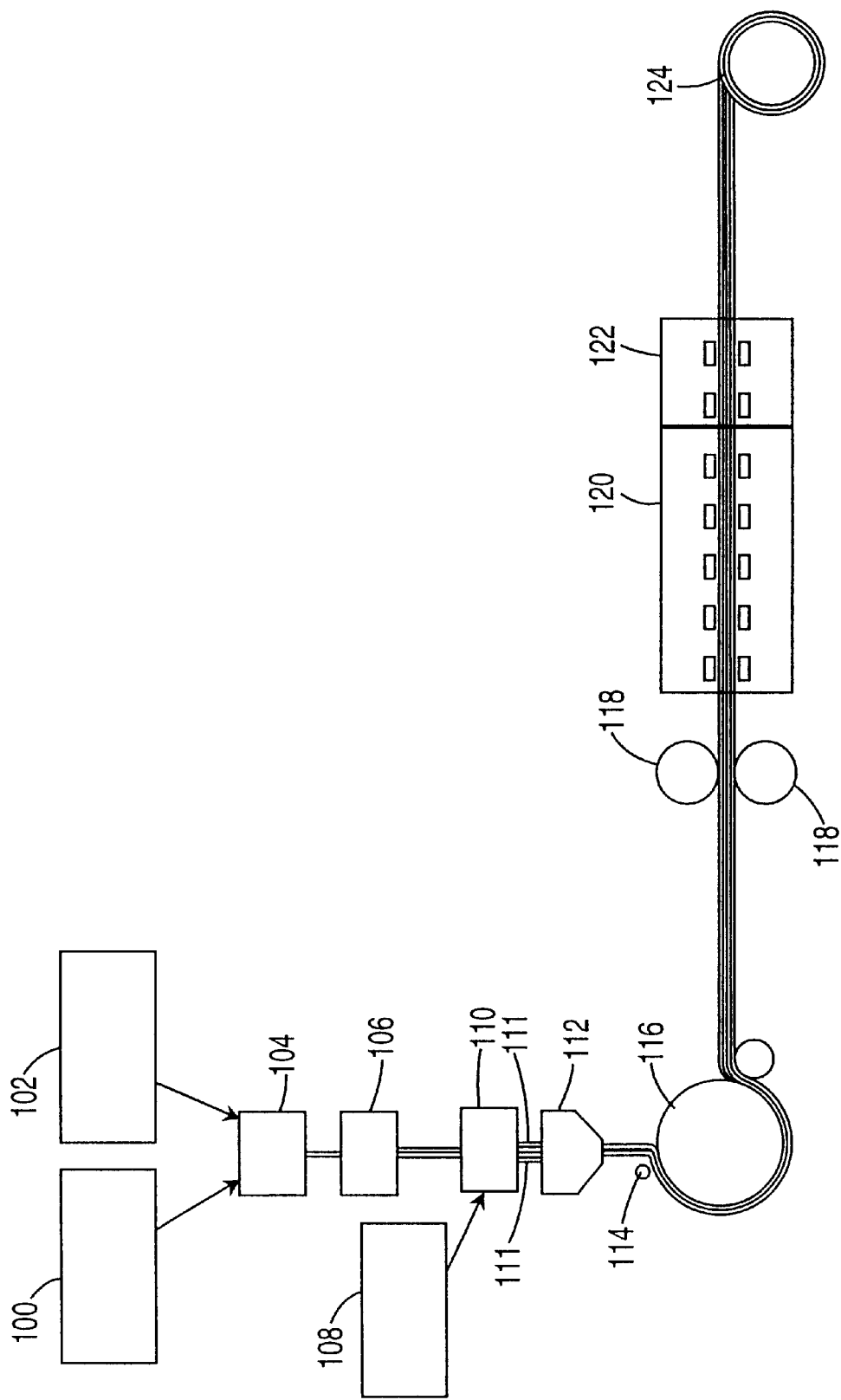
FIG. 17 is a schematic diagram of a manufacturing process for making the multilayer film of the present invention.

III. Manufacture:

A preferred method of making the multilayer film of the present invention is illustrated schematically in FIG. 17. To make multilayer optical films, materials 100 and 102 selected to have suitably different optical properties are heated above their melting and/or glass transition temperatures and fed into a multilayer feedblock 104, with or without a layer multiplier 106. A layer multiplier splits the multilayer flow stream, and then redirects and "stacks" one stream atop the second to multiply the number of layers extruded. An asymmetric multiplier, when used with extrusion equipment that introduces layer thickness deviations throughout the stack, may broaden the distribution of layer thicknesses so as to enable the multilayer film to have layer pairs corresponding to a desired portion of the visible spectrum of light, and provide a desired layer thickness gradient. Skin layers may also be introduced by providing resin 108 for skin layers to a skin layer feedblock 110, as shown.

The multilayer feedblock feeds a film extrusion die 112. Feedblocks useful in the manufacture of the present invention are described in, for example, U.S. Pat. Nos. 3,773,882 (Schrenk) and 3,884,606 (Schrenk), the contents of which are incorporated by reference herein. As an example, the extrusion temperature may be approximately 295° C., and the feed rate approximately 10–150 kg/hour for each material. It is desirable in most cases to have skin layers 111 flowing on the upper and lower surfaces of the film as it goes through the feedblock and die. These layers serve to dissipate the large stress gradient found near the wall, leading to smoother extrusion of the optical layers. Typical extrusion rates for each skin layer would be 2–50 kg/hr (1–40% of the total throughput). The skin material may be the same as one of the optical layers, or a third polymer.

After exiting the film extrusion die, the melt is cooled on a casting wheel 116, which rotates past pinning wire 114. The pinning wire pins the extrudate to the casting wheel. To achieve a clear film over a broader range of angles, one need only make the film thicker by running the casting wheel more slowly. This moves the low band edge farther away from the upper end of the visible spectrum (700 nm). In this way, the color shift of the films of this invention may be adjusted for the desired color shift. The film is oriented by stretching at ratios determined with reference to the desired optical and mechanical properties. Longitudinal stretching may be done by pull rolls 118, and transverse stretching in tenter oven 120, for example, or the film may be simultaneously biaxially oriented. Stretch ratios of approximately 3–4 to 1 are preferred, although ratios as small as 2 to 1 and as large as 6 to 1 may also be appropriate to a given film. Stretch temperatures will depend on the type of birefringent polymer used, but 2° to 33° C. (5° to 60° F.) above its glass transition temperature would generally be an appropriate range. The film is typically heat set in the last two zones 122 of a tenter oven to impart the maximum crystallinity in the film and reduce its shrinkage. Employing a heat set temperature as high as possible without causing film breakage in the tenter reduces the shrinkage during a heated embossing step. A reduction in the width of the tenter rails by about 1–4% also serves to reduce film shrinkage. If the film is not heat set, heat shrink properties are maximized, which may be desirable in some security packaging applications. The film may be collected on windup roll 124.

Figure 18B:
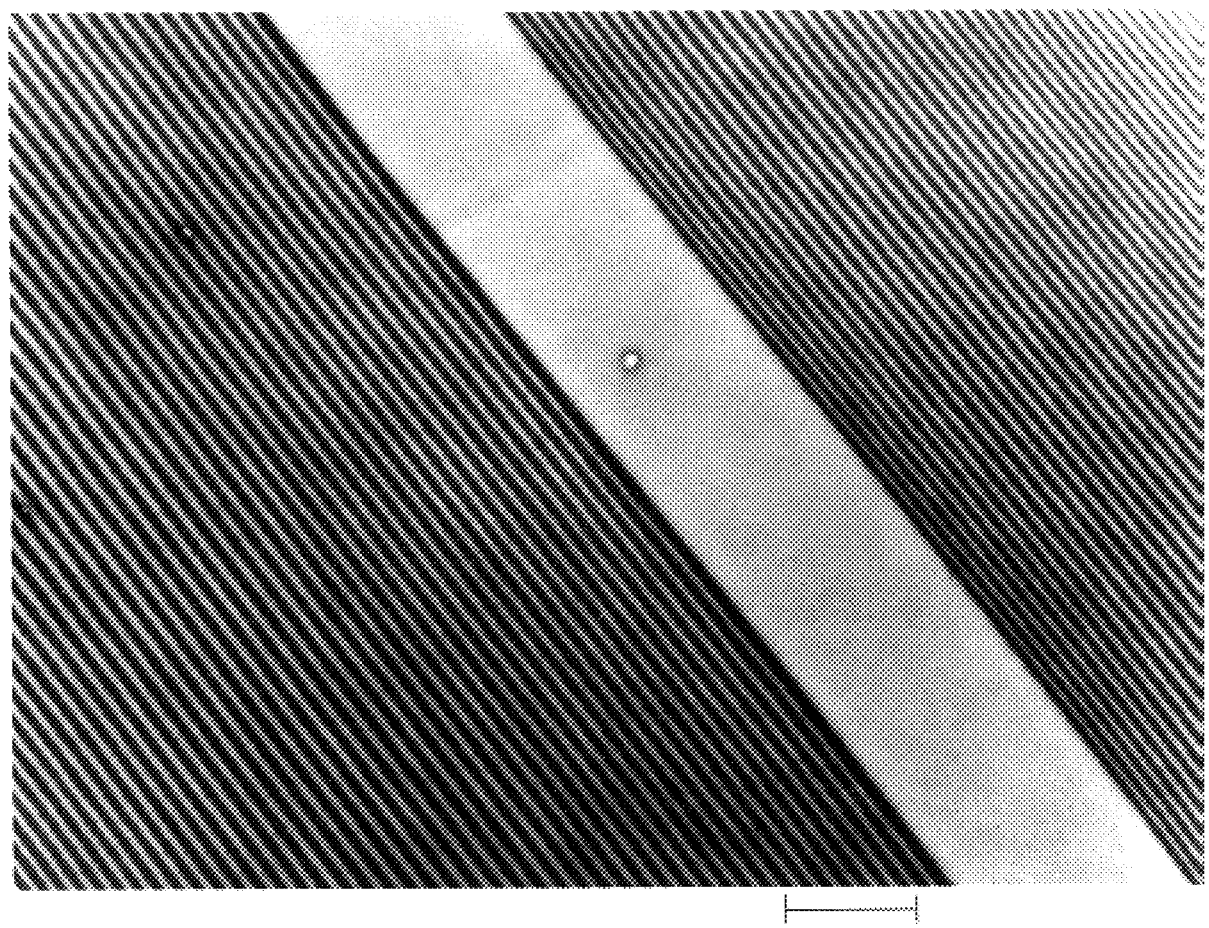
Figure 18C:
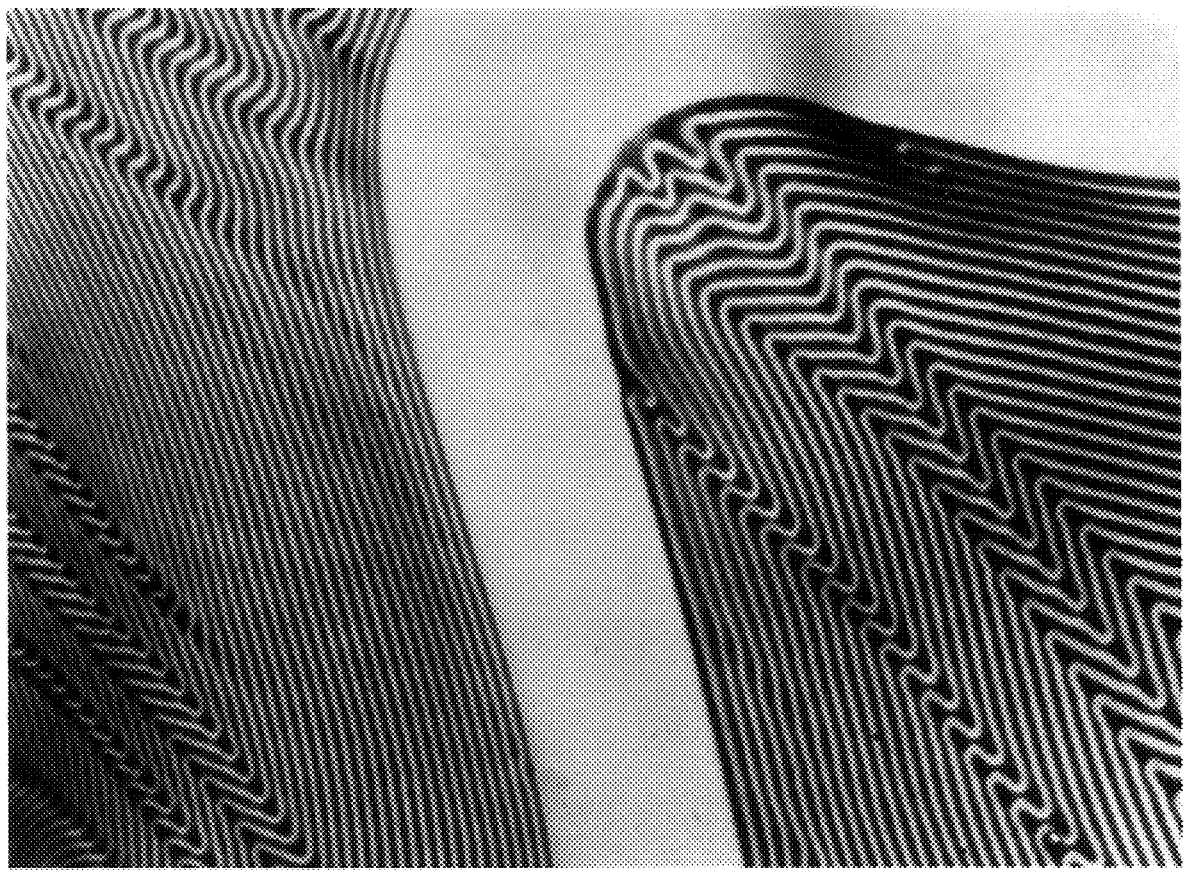

The multilayer film of the present invention may also be embossed, which provides additional features and benefits. The embossed image may be alphanumeric, for example, so that the name of the producer or issuer of the item of value will appear on the film. Official seals or corporate logos may also be embossed, and quite fine detail may be achieved. The film may be embossed by a male die alone, a male/female die combination, or a female die alone (in combination with, for example, an applied vacuum). It is preferred that the embossing step achieve a reduction in the layer thicknesses of the optical layers, and that the reduction be greater than 5%, preferably greater than approximately 10%. When this occurs, a noticeable shift in color of the embossed areas compared to the unembossed areas is achieved, which is believed to be due to layer thickness reduction and the deformative effects of embossing at the boundaries of the embossed areas. This effect is very different than what is observed in holograms, where multiple colors of the rainbow are seen as viewing angle is changed. FIGS. 18A, 18B, and 18C illustrate a multilayer film of the present invention before embossing, after embossing, and at an area between an embossed and an unembossed area, respectively. Note the overall compression in layer thickness between FIGS. 18A and 18B, and rippled layers in FIG. 18C. Embossing makes the clear to cyan film of the invention even more noticeable, and prevents the unauthorized reuse of film from one security application for another. The embossing step is preferably done above the glass transition temperature of both of the polymers in the multilayer film. In the case of a film that uses a third polymer for skin layers, these may either be removed prior to embossing, or also have a glass transition temperature below the desired embossing temperature.

IV. Additional Layers and Features

In addition to the skin layer described above, which add physical strength to the film and reduce problems during processing, other layers and features of the inventive film may include slip agents, low adhesion backsize materials, conductive coatings, antistatic, antireflective or antifogging coatings or films, barrier layers, flame retardants, UV stabilizers or protective layers, abrasion resistant materials, optical coatings, or substrates to improve the mechanical integrity or strength of the film. Noncontinuous layers may also be incorporated into the film to prevent tampering.

V. Security Applications for Clear to Cyan Films

The clear to cyan multilayer film of the invention is particularly valuable as a component of a system for authenticating items of value. The film may be used on a document, for example, so that an observer can read the document when it is held at approximately a zero degree observation angle, and can tell whether the document is authentic when it is held at an angle greater than the shift angle. This would be useful for a passport, for example.

In the case of the clear to cyan polarizer, the cyan color typically is not as noticeable to the naked eye, especially if the shift angle is larger than 60 degrees. This may be desirable for reasonably covert security systems. A label made from the above polarizer would look much like a standard polyester label, but under careful observation through a polarizing verifier, the cyan color would be quite evident at observation angles greater than the shift angle.

Another useful application for the multilayer film of the invention is as a tape or label, which may be adhesively secured to a package for consumer goods, for example. Again, if the package is viewed at approximately a zero degree observation angle, the purchaser can see any information or images provided on the packaging, and if the package is viewed at an angle greater than the shift angle, can verify that the goods are not counterfeit. When the film is provided as a tape or label, an adhesive is applied to one major surface of the film so that it may be applied to an object. The adhesive should be transparent or a diffuse white light scatterer, so that the film appears cyan at greater than the shift angle. It is preferably a pressure sensitive adhesive, although hot-melt adhesives or curable adhesives are also contemplated.

Images may be provided on either major surface of the film, by any suitable technique. One unique application of ink is the use of cyan ink (perhaps in addition to other colors) on the under side of the film from the viewer. Under those circumstances, the total printed image is visible at approximately a zero degree observation angle, but the cyan printing is hidden at angles greater than the shift angle. Another useful color for larger printed areas is black, because it absorbs any light that reaches it. In this case, only the specularly reflected red light is noticeable. In practice, black text with standard font sizes (8–18 point type), don't show this effect, because the adjacent white areas scatter sufficient cyan light at shallow angles to "wash out" the specular red. However, if larger black areas were used adjacent white areas, for example, the black areas would appear red and the white areas would appear cyan.

Other security features that may be incorporated into the film of the present invention, or any suitable construction of which the film is a part, include microperforations that effectively prevent tampering, heat shrink characteristics that prevent tampering by the application of heat, patterned differential adhesion layers that effectively prevent tampering by delamination (of the type described in U.S. Pat. Nos. 5,510,171 (Faykish) and 5,683,774 (Faykish et al.), for example), and internal delamination characteristics (of the type described in U.S. Pat. No. 5,770,280 (Gosselin et al.), for example) that provide an indication of tampering. The film of the present invention may also be incorporated into any suitable label, laminate, or card (such as an identification card).

The clear to cyan multilayer film of the present invention has several advantages over conventional inorganic quarter wave stacks. First, it is very flexible, which enables it to be used for applications in which inorganic quarter wave stacks would likely crack. Second, it is comparatively inexpensive, because it doesn't involve the sequential deposition of at least five layers of material, as does the inorganic quarter wave stack. Third, the cyan color presented by the multilayer films of the present invention always appear more intense than would a similar color in an inorganic quarter wave stack, due to the high reflectivity by the former of p-polarized light and the match of band edge shift for s and p polarized light, as shown in FIGS. 7 through 11, for example.

For the clear to cyan polarizer, a potential counterfeiter would be forced to simulate the color shift and find a transparent polarizing coating or film. The tendency for the uniaxially oriented film to break into fibrils is itself a deterrent to tampering.

Although a visible optical effect makes for simple authentication, machine verification is feasible with a spectrometer. The transmission spectra of these films, particularly under s- and p-polarization states, is very strong proof of authenticity.

VI. EXAMPLES

To illustrate the manufacture and performance of certain embodiments of the present invention, the following Examples are provided. Comparative Example A describes a conventional near-IR reflector, and Examples 1 through 13 describe the present invention.

Comparative Example A

Figure 19:
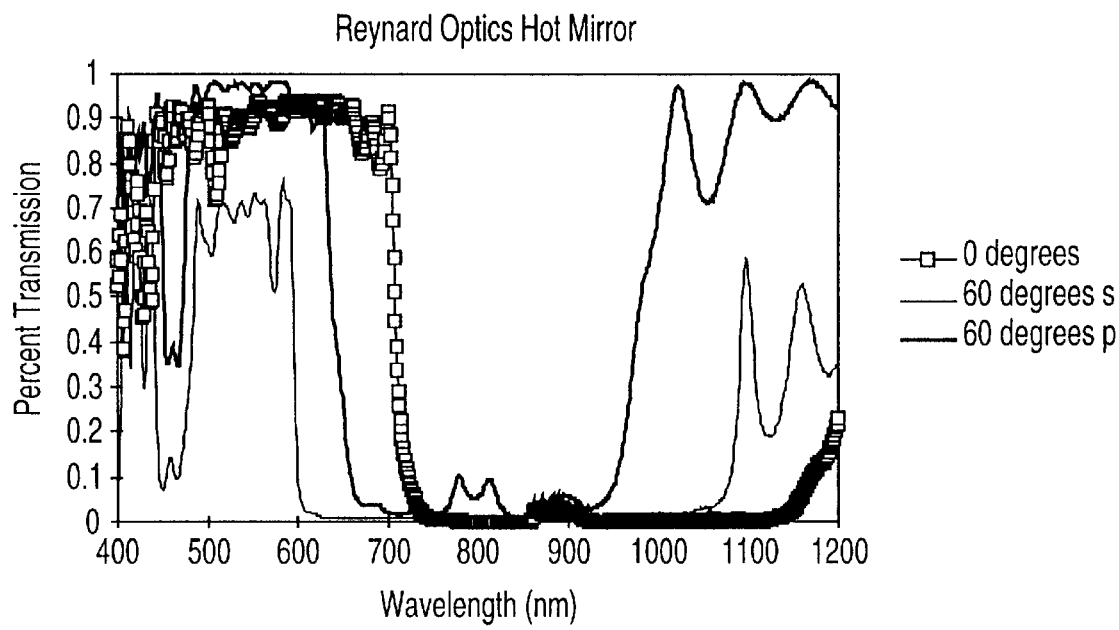
FIGS. 19, 20, 21, 22, 23, and 24 are transmission spectra associated with the Examples.

A mirror available from the Reynard Corporation of San Clemente, Calif. under the Catalog #610 was tested by analyzing the amount of light transmitted as a function of the wavelength of the light, at both a zero degree observation and a 60 degree observation angle (s and p polarized light plotted separately). The mirror transmitted visible light, but reflected infrared light, and was made of 36 layers of titania and silica, which are isotropic materials. The transmission spectrum is shown in FIG. 19. The low wavelength band edge of the Reynard Optics mirror is at 720 nm at a zero degree observation angle. The mirror appears slightly yellowish at normal incidence, as indicated by the CIE coordinates (L*=95.7, a*=−1.07 and b*=8.35) calculated from the spectra. At a 60 degree observation angle the low wavelength band edge shifts to about 600 nm for s-polarized light and to about 650 for p-polarized light. The visual effect of this mirror is a relatively gradual shift in color from yellowish-clear to greenish-cyan. The CIE coordinates at 60 degrees are L*=88.3, a*=−25.6 and b*=21.6. The $2^{nd}$ order reflectance peak at about 460 nm blocks some blue light, giving the mirror a positive, rather than negative b*. The mirror is very prone to cracking, and is quite expensive—about $2.80 per square centimeter ($18 per square inch).

Example 1

A multilayer film containing about 418 layers was made on a sequential flat-film making line via a coextrusion process. This multilayer polymer film was made PET and ECDEL™ 9967 where PET was the outer layer or "skin" layer. A feedblock method (such as that described by U.S. Pat. No. 3,801,429) was used to generate about 209 layers with an approximately linear layer thickness gradient from layer to layer.

The PET, with an intrinsic viscosity (IV) of 0.60 dl/g was pumped to the feedblock at a rate of about 34.0 Kg/hr and the ECDEL™ at about 32.8 Kg/hr. After the feedblock, the same PET extruder delivered PET as protective boundary layers to both sides of the extrudate at about 8 Kg/hr total flow. The material stream then passed though an asymmetric double multiplier, as described in U.S. Pat. Nos. 5,094,788 and 5,094,793, with a multiplier ratio of about 1.40. The multiplier ratio is defined as the average layer thickness of layers produced in the major conduit divided by the average layer thickness of layers in the minor conduit. Each set of 209 layers has the approximate layer thickness profile created by the feedblock, with overall thickness scale factors determined by the multiplier and film extrusion rates.

The ECDEL™ melt process equipment was maintained at about 250° C., the PET (optics layers) melt process equipment was maintained at about 265° C., and the multiplier, skin-layer meltstream and die were maintained at about 274° C.

The feedblock used to make the film for this example was designed to give a linear layer thickness distribution with a 1.3:1 ratio of thickest to thinnest layers under isothermal conditions. To achieve a smaller ratio for this example, a thermal profile was applied to the feedblock. The portion of the feedblock making the thinnest layers was heated to 285° C., while the portion making the thickest layers was heated to 268° C. In this manner the thinnest layers are made thicker than with isothermal feedblock operation, and the thickest layers are made thinner than under isothermal operation. Portions intermediate were set to follow a linear temperature profile between these two extremes. The overall effect is a narrower layer thickness distribution which results in a narrower reflectance spectrum. Some layer thickness errors are introduced by the multiplier, and account for the minor differences in the spectral features of each reflectance band. The casting wheel speed was set at 6.5 m/min (21.2 ft/min).

Figure 20:
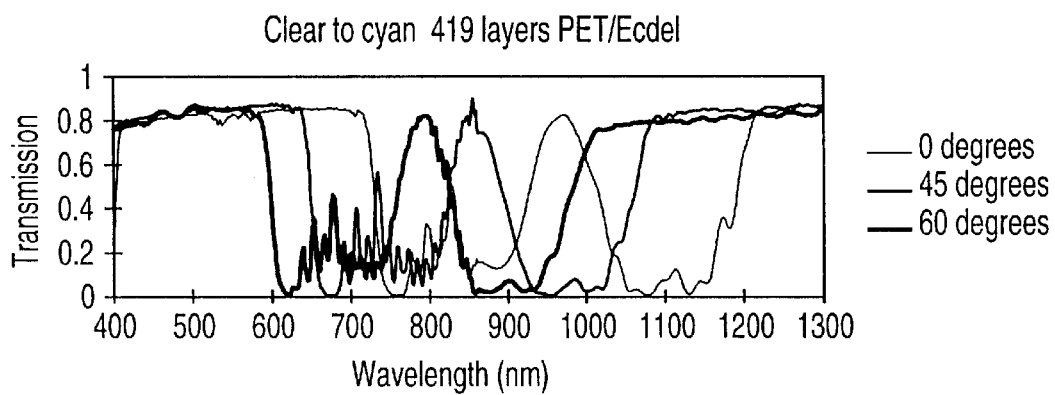

After the multiplier, thick symmetric skin layers were added at about 35.0 Kg/hour that was fed from a third extruder. Then the material stream passed through a film die and onto a water cooled casting wheel. The inlet water temperature on the casting wheel was about 70° C. A high voltage pinning system was used to pin the extrudate to the casting wheel. The pinning wire was about 0.17 mm thick and a voltage of about 5.5 kV was applied. The pinning wire was positioned manually by an operator about 3–5 mm from the web at the point of contact to the casting wheel to obtain a smooth appearance to the cast web. The cast web was continuously oriented by conventional sequential length orienter (LO) and tenter equipment. The web was length oriented to a draw ratio of about 2.5 at about 100 ° C. The film was preheated to about 100° C. in about 22 seconds in the tenter and drawn in the transverse direction to a draw ratio of about 3.3 at a rate of about 20% per second. The film was heat set for about 20 seconds in an oven zone set at 226 ° C. The finished film had a final thickness of about 0.08 mm. Its transmission spectra is included as FIG. 20.

The band edge at normal incidence was 720 nm, just beyond the visible edge of 700 nm, so that the film looked clear. At 45 degrees, the band edge had shifted over to 640 nm, and the film appeared cyan. At 60 degrees, the total lack of transmitted red light made the film a brilliant cyan, due to the high reflectance of the multilayer stack even at this angle of incidence. If this film is viewed where there is only a single light source, the specular reflection was evident (red) even with a white paper background. When laminated to a black background (no transmitted light), the red was easily visible. Although this film exhibited the desired color change, a film of fewer layers and narrower bandwidth would be more desirable.

Example 2

The film of Example 1 was transfer laminated with an acrylic pressure sensitive adhesive to make a security film. This film was then laminated to an identification card. The printed indicia and picture on the card were easily visible through the film at a zero degree observation angle, but the film appeared cyan when viewed from greater than about a 30 degree observation angle, and appeared increasingly more cyan with increasing observation angle.

Example 3

The film of Example 1 was transfer laminated with an acrylic pressure sensitive adhesive, and then slit to 5.08 cm (2 in) in width to make a box sealing tape. The tape was applied to a Hewlett Packard laser printer cartridge box to simulate a security tape. The uniqueness of this tape is readily apparent as one approaches the box, because the face of the box normal to the observer shows a clear tape, while another face of the box is presented at a large observation angle and therefore appears cyan. If consumers or retailers of a boxed product such as this are notified that the manufacturer uses only clear to cyan tape (and not normal clear box sealing tape), then those purchasers will be able to determine whether the boxed item is authentic by simple inspection.

Example 4

The film of Example 1 was embossed between a roll at 1490° C. (300° F.) and a pre-heated plate. The film thinned down from 3.4 mils to about 3.0 mils in the embossed regions. A surprising result of this embossing was the how apparent a gold reflection became. A bright gold was observed in the embossed region changing to cyan or deeper blue as the viewing angle is made shallower. The appearance was similar to gold leaf, yet (at least in this example) is not as uniform. Bright red and green were also apparent. The dramatic change from gold to blue while the unembossed areas change from clear to cyan provided an overt verification feature that was more dramatic than a transparent hologram.

Example 5

The film of Example 1 was laminated with an acrylic transfer adhesive available from 3M under the designation 9458 to pre-printed white polyester label stock available from 3M under the designation 7331, then die cut into labels at 46 meters/min (150 ft/min). The color change was easily noticed even in a 1.27×2.54 cm (0.5×1 in) label.

Example 6

Figure 21:
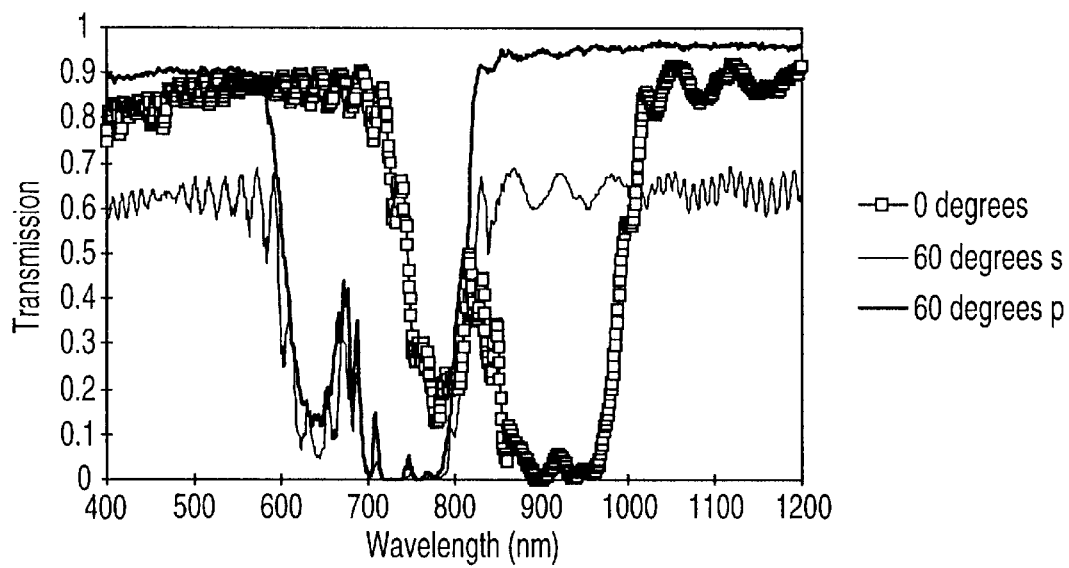

PET was extruded at 274° C. (525° F.) and Ecdel at 243° C. (470° F.) through a feedblock containing 224 slots. The total throughput was 100 kg/hr (225 lb/hr), with about 25% of the total flow going to skin layers of PET on both surfaces of the film. The ratio of the volumetric flow rates in the optical layers was 1:1. The film was oriented 3.3:1 in length at 88° C. (190° F.) and 3.8:1 in width at 93° C. (200° F.). It was heat set at 246° C. (475° F.) for about 15 seconds in the last two zones of the tenter oven. The film so made had less than the desired number or uniformity of layers on the low wavelength side of the reflectance stack. This gave the spectra shown in FIG. 21, where a noticeable shoulder with 10% transmission is evident. The film of this example turns cyan, but more gradually and with less intensity than the film of Example 1.

Example 7

Water-based ink from the Werneke Ink Co. of Plymouth, Minn. made with 1.5 the color concentrations of the Pantone ink color specification 317 was pulled as a hand-spread onto the film of Example 6. When viewed through the film, the ink was readily apparent at normal incidence, but was difficult to see at observation angles beyond 40°.

Example 8

Figure 22:
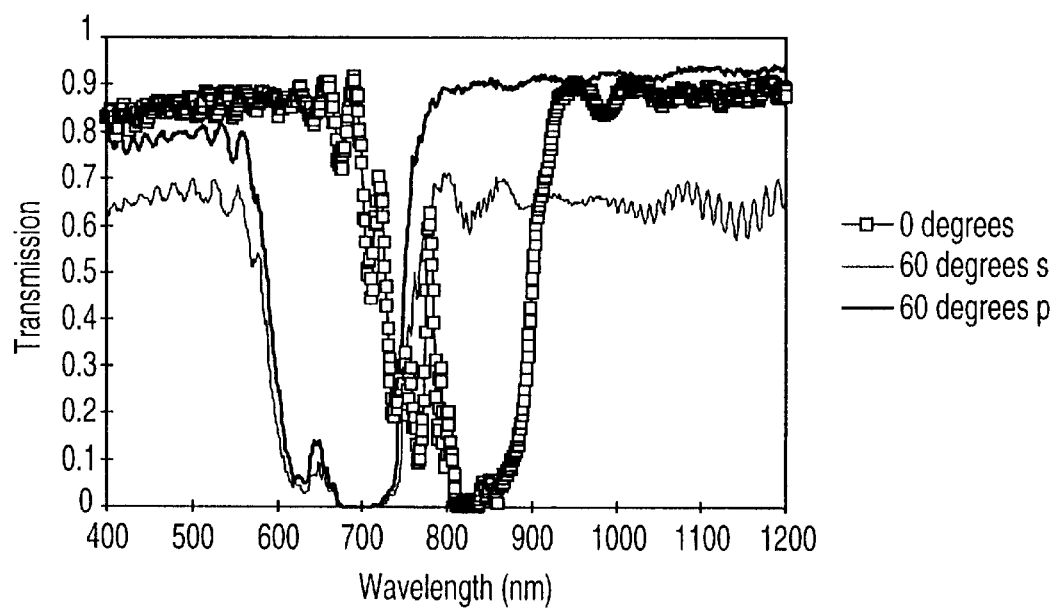

PET was extruded at 274° C. (525° F.) and Ecdel at 243° C. (470° F.) through a feedblock containing 224 slots. The PET used in the optical layers was extruded at 60.5 kg/hr and the Ecdel at 41.5 kg/hr. The PET skin layers were extruded at 11.8 kg/hr. The casting wheel speed was 6.5 meters/min. A high voltage pinning system was used to pin the extrudate to the casting wheel. The pinning wire was about 0.17 mm thick and a voltage of about 5.5 kV was applied. The pinning wire was positioned manually by an operator about 3–5 mm from the web at the point of contact to the casting wheel to obtain a smooth appearance to the cast web. The cast web was continuously oriented by conventional sequential length orienter (LO) and tenter equipment. The film was oriented 3.3:1 in length at 88° C. (190° F.) and 4.5:1 in width at 113° C. (235° F.). It was heat set at 243° C. (470° F.) for about 17 seconds in the last two zones of the tenter oven. The film so made had less than the desired number or uniformity of layers on the low wavelength side of the reflectance stack. This gave the spectra shown in FIG. 22, where a shoulder was again evident. Because the low wavelength band edge is close to the edge of the visible region (700 nm), the film changes from clear to a deep cyan, noticeably faster and deeper than the film of Example 6 and FIG. 21, since the shoulder was not as severe. The Yxy and CIE L*a*b coordinates calculated from the spectra are shown in Table I, below, including coordinates for each of s- and p-polarized light.

TABLE I

| Angle | s or p | x | y | L* | a* | b* |
|---|---|---|---|---|---|---|
| 0 |  | .316 | .334 | 94.37 | −.37 | 1.36 |
| 60 |  | .237 | .327 | 80.66 | −35.88 | −12.52 |
| 60 | p | .240 | .328 | 83.86 | −35.56 | −12.03 |
| 60 | s | .232 | .325 | 77.24 | −36.16 | −13.33 |

Example 9

The film of Example 8 was embossed in-line at 15 meters/min (50 ft/min) with a pattern of small globes. The film wrapped a first steel roll heated to 188° C. (370° F.) for about 75% of its circumference, was passed through a nip against the 110° C. (230° F.) embossing roll of 193 N/cm (110 pounds/in) of film width, and stayed on this roll for 75% of its circumference before being wound onto a 7.62 cm (3 in) diameter core. The embossed portions exhibit an eye-catching gold coloration that changes to a cyan, then blue transmitted color as one moves from a 0 to 80 degree observation angle.

Example 10

The film of Example 6 was embossed at 3 m/min (10 ft/min), at a force of 175 N/cm (100 pounds/in) of film width with 182° C. (360° F.) pre-heat roll and 88° C. (190° F.) embossing roll with a variety of security seals. Very fine embossing detail was achieved.

Example 11

The embossed film of Example 8 was coated with a low adhesion backsize (LAB) consisting of polyvinyl-n-carbamate (3M urethane LAB RD 1530) dilute to 1.25 weight percent solids in toluene. Coating was carried out to achieve 0.03 g/m$^2$ (25g/1000 yd$^2$.), which was about 125 nm thick. Zero point two weight percent of the solution contained chlorinated polyolefin (Eastman 343) as a primer. The pressure sensitive adhesive (PSA) formulation listed below was applied as a hot melt at 199° C. to the film of Example 6 on the opposite side of the LAB coating.

| | |
|---|---|
| SIS block copolymer rubber Kraton 1107 | 100 parts |
| Wingtac Plus tackifier (five carbons) | 100 parts |
| TiO2 | 5–8 parts |
| Cynanox LTDP antioxidant | 1.5 parts |
| Irganox 1076 antioxidant | 1.5 parts |

The coating weight was about 60 g/cm$^2$. The white PSA provides for good diffuse scattering in direct contact with the clear to cyan film of the invention, and a very evident color shift. Adhesion and strength properties of the box sealing tape are comparable to standard polyester or polypropylene tapes.

Example 12

The embossed film of Example 10 was extrusion coated with ethylene vinyl acetate resins available from DuPont de Nemours Company of Wilmington, Del. under the designation ELVAX™, and an ethylene acrylic acid resin available from the Dow Chemical Company of Midland, Mich. under the designation PRIMACOR™, as shown below.

| Resin | Comonomer level (%) | Coating thickness (micrometers) |
|---|---|---|
| Elvax 3124 | 9 | 25 |
| Elvax 3170 | 18 | 25 |
| Elvax 3180 | 28 | 25 |
| Primacor 3330 | 6.5 | 25 |

Ultraviolet light was used to bond these layers to one of the polyester skin layers of the embossed clear to cyan film. A Citizen Printiva Model 660C was used to reverse image print onto the EVA or EAA resin. The printed films with hot melt adhesive resin were then placed in register with a page of a passport book, and laminated at 130° C. The clear to cyan film laminate provides for easy viewing of the information, yet a very overt shift to cyan over the whole page of the passport book when the observation angle changed. Lamination over a pre-printed driver's license also was facile, and provided for easy verification without tools.

Example 13

A simple means of verification that could be used with the inventive film (perhaps by a policeman at night) is to shine a flashlight that produces white light onto the clear to cyan film. At normal incidence, the printing below is evident, and the film looks clear. When the film laminated to a diffuse white backing is tilted to be beyond the shift angle, a red beam may be readily observed on piece of paper held in a position to intersect with the specular reflection.

Example 14

A coextruded film containing 224 layers was made on a sequential flat-film making line by a coextrusion process.

This multilayer polymer film was made from polyethylene naphthalate (PEN)(60 wt. % phenol/40 wt. % dichlorobenzene)) with an intrinsic viscosity of 0.48 dl/g available from the Eastman Chemical Company and polymethyl methacrylate (PMMA) available from Ashland Chemical Company under the designation CP82, where PEN provided the outer or "skin" layers. A feedblock method (such as that described by U.S. Pat. No. 3,801,429) was used to generate about 224 layers which were coextruded onto a water chilled casting wheel and continuously oriented by conventional sequential length orienter (LO) and tenter equipment. PEN was delivered to the feedblock by one extruder at a rate of 38.3 Kg/hr and the PMMA was delivered by another extruder at a rate of 30.1 Kg/hr. These meltstreams were directed to the feedblock to create the PEN and PMMA optical layers. The feedblock created 224 alternating layers of PEN and PMMA with the two outside layers of PEN serving as the protective boundary layers (PBL's) through the feedblock. The PMMA melt process equipment was maintained at about 249° C.; the PEN melt process equipment, feedblock, skin-layer modules were maintained at about 274° C.; and the die was maintained at about 282° C. An approximately linear gradient in layer thickness was designed for the feedblock for each material with the ratio of thickest to thinnest layers being about 1.31.

After the feedblock, a third extruder delivered 0.48 IV PEN as skin layers (same thickness on both sides of the optical layer stream) at about 17.3 Kg/hr. Then the material stream passed through a film die and onto a water cooled casting wheel using an inlet water temperature of about 7° Celsius. A high voltage pinning system was used to pin the extrudate to the casting wheel at 4.3 meters/min. The pinning wire was about 0.17 mm thick and a voltage of about 5.5 kV was applied. The pinning wire was positioned manually by an operator about 3–5 mm from the web at the point of contact to the casting wheel to obtain a smooth appearance to the cast web.

Figure 23:
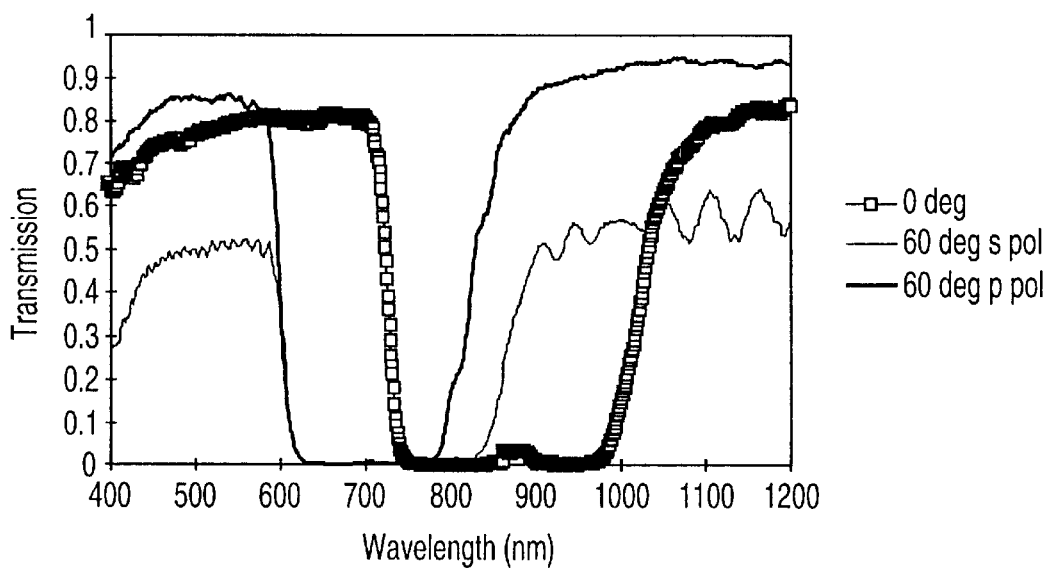

The cast web was length oriented with a draw ratio of about 3.8:1 at about 130° C. In the tenter, the film was preheated before drawing to about 140° C. in about 9 seconds and then drawn in the transverse direction at about 140° C. to a draw ratio of about 4.5:1, at a rate of about 60% per second. The finished film had a final thickness of about 0.05 mm. The optical spectra are shown in FIG. 23. The reflection band is strong at both 0 and 60 degrees, and the low wavelength band edges for both s- and p-polarized light are coincident. This provides for the sharpest transition from clear to cyan and the deepest cyan of any of the exemplary films. The band edge for p polarized light changes from 50% transmission to 10% transmission over a 10 nm interval. The Yxy and CIE L*a*b color coordinates calculated from the spectra are contained in Table II. Again, color coordinates for both s- and p-polarized light are included.

TABLE II

| Angle | p or s | x | y | L* | a* | b* |
|---|---|---|---|---|---|---|
| 0 |  | .322 | .341 | 91.3 | −.60 | 5.1 |
| 60 |  | .251 | .342 | 80.2 | −33.7 | −5.9 |
| 60 | p | .246 | .337 | 87.3 | −37.3 | −8.9 |
| 60 | s | .261 | .350 | 71.7 | −29.2 | −1.7 |

Example 15

PEN was fed at a rate of 81 lb/hr (37 kg/hr) and at a temperature of 525 IF (274 IC) into a 224 layer feedblock. A copolyester of 70% naphthalate and 30% isophthalate with ethylene glycol was fed into the feedblock at a rate of 117 lb/hr (53 kg/hr) and at a temperature of 540° F. (282° C.) for the skin layers, and at a rate of 115 lb/hr (52.3 k/hr) and a temperature of 525° F. (274° C.) for the optical layers. The temperature of the feedblock was maintained at 555° F. (290° C.). The web was cast at 20 meters/min and was stretched in a tenter oven at 154° C. to a stretch ratio of 6:1 to produce a clear to cyan polarizer film.

Figure 24:
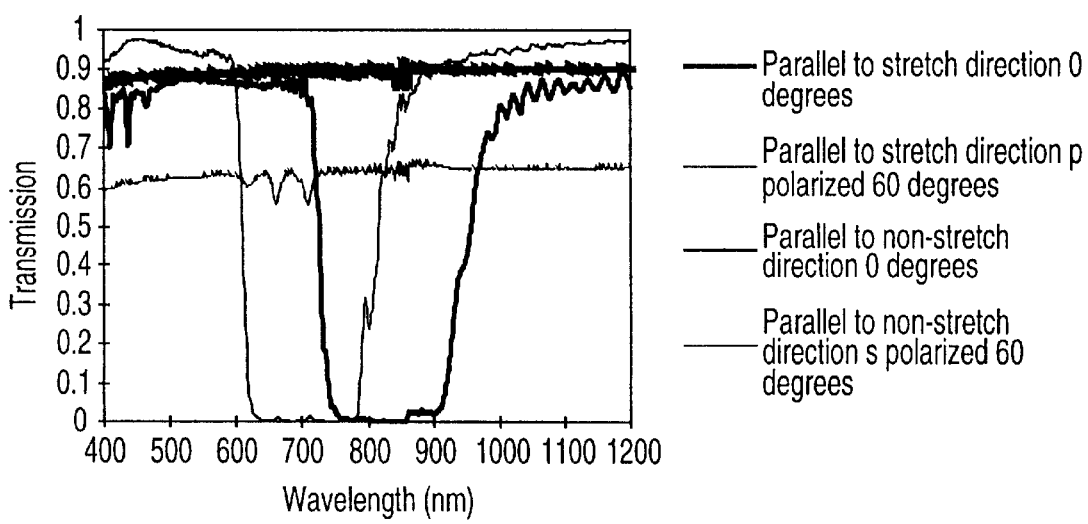

The film appeared clear to cyan to the unaided eye when viewed in transmission or when viewed in reflection after being laminated to a white, diffuse background. When the film was viewed through a second (neutral) polarizer with its transmission axis at 90° to that of the example film, the cyan is more vivid, and when the neutral polarizer was rotated so that its transmission axis was parallel to the transmission axis of the polarizer film, white light was transmitted. FIG. 24 shows the transmission spectra for the case of the e-field of the incident light parallel to the stretch direction and parallel to the non-stretch direction at 0 and 60 degrees to these films. Note the reflectance band shift of about 120 nm from 0 degrees to 60 degrees of incidence with e-field parallel to the stretch direction, and the lack of a peak when the e-field is parallel to the non-stretch direction. This corresponds to a vivid clear to cyan shift and staying clear. The Yxy and CIE L*a*b color coordinates calculated from this spectra are tabulated in Table III, below.

TABLE III

| Parallel to | Angle | s or p | x | y | L* | a* | b* |
|---|---|---|---|---|---|---|---|
| Stretch Direction | 0 |  | .317 | .338 | 94.6 | −1.73 | 3.25 |
| Stretch Direction | 60 | p | .266 | .330 | 93.8 | −25.0 | −8.36 |
| Non-stretch Direction | 60 | s | .315 | .334 | 83.5 | −0.81 | 1.09 |

Various other embodiments of the present invention will be evident to one of ordinary skill in the art. Accordingly, the scope of the invention is limited only by the following claims.

We claim:

1. A multilayer film comprising alternating layers of at least a first polymer and a second polymer; the film appearing substantially clear at approximately a zero degree observation angle, and colored at at least one observation angle greater than a predetermined shift angle wherein the film comprises a series of layer pairs having optical thicknesses of between approximately 360 nanometers and approximately 450 nanometers.

2. A multilayer film comprising alternating layers of at least a first polymer and a second polymer, the film transmitting substantially all incident visible light and reflecting light having a wavelength of from approximately 720 to 900 nanometers at approximately a zero degree observation angle, and transmitting substantially all visible light except a selected portion of red light at at least one observation angle greater than a predetermined shift angle.

3. The multilayer film of claim 1, wherein the film appears cyan in transmission at at least one observation angle greater than a predetermined shift angle.

4. The multilayer film of claim 2, wherein the film reflects substantially all light having a wavelength of from approximately 720 to 900 nanometers.

5. The multilayer film of claim 1 or 2, wherein the first polymer is selected from the group consisting of polyethylene terephthalate and copolymers incorporating terephthalic acid and polyethylene naphthalate and copolymers incorporating naphthalene dicarboxylic acid, and the second polymer is selected from the group consisting of a copolyester of cyclohexane dimethanol, polytetramethylene ether, and cyclohexanedicarboxylic acid, polymethyl methacrylate, a copolymer incorporating polymethyl methacrylate, and polyethylene terephthalate glycol.

6. The multilayer film of claim 5, wherein the first polymer is polyethylene naphthalate, and the second polymer is polymethyl methacrylate.

7. The multilayer film of claim 5, wherein the first polymer is polyethylene naphthalate, and the second polymer is polyethylene terephthalate glycol.

8. The multilayer film of claim 5, wherein the first polymer is polyethylene terephthalate and the second polymer is a copolyester of cyclohexane dimethanol, polytetramethylene ether, and cyclohexanedicarboxylic acid.

9. The multilayer film of claim 1 or 2, wherein the thickness of the layers generally increases from one major surface of the film to the other.

10. The multilayer film of claim 1 or 2, wherein the thickness of the layers first decreases, then increases, and then decreases from one major surface of the film to the other.

11. The multilayer film of claim 1 or 2, wherein the film includes an adhesive layer on one major surface of the film.

12. The multilayer film of claim 11, wherein the adhesive is a pressure sensitive adhesive.

13. The multilayer film of claim 12, wherein the adhesive is adhered to a removable liner.

14. The multilayer film of claim 11, wherein the adhesive is a heat activated adhesive.

15. The multilayer film of claim 11, wherein the adhesive is curable.

16. The multilayer film of claim 11, wherein the film further comprises a patterned differential adhesion layer.

17. The multilayer film of claim 1 or 2, wherein the film is adhered to an item.

18. The multilayer film of claim 1 or 2, wherein the film is a component of a passport.

19. The multilayer film of claim 17, wherein the item is a document with printing visible through the film at approximately a zero degree observation angle.

20. The multilayer film of claim 1 or 2, wherein the film further includes at least one image printed thereon.

21. The multilayer film of claim 20, wherein at least one image is printed in cyan ink, and is perceptible at approximately a zero degree observation angle, and substantially imperceptible at an observation angle greater than the shift angle.

22. The multilayer film of claim 20, wherein at least one image is printed in black ink, and appears black at approximately a zero degree observation angle, and red at an observation angle greater than the shift angle.

23. The multilayer film of claim 1 or 2, wherein the shift angle is between 15 and 75 degrees.

24. The multilayer film of claim 23, wherein the shift angle is between 30 and 70 degrees.

25. The multilayer film of claim 1 or 2, wherein the film is applied to an item such that one portion of the film appears clear, and an adjacent portion of the film appears cyan.

26. The multilayer film of claim 25, wherein the item is a box, and the film is applied to two adjacent faces of the box.

27. The multilayer film of claim 1 or 2, wherein the film has embossed portions.

28. The multilayer film of claim 27, wherein the embossed portions have a thickness that is between 5% and 50% thinner than non-embossed portions.

29. The multilayer film of claim 27, wherein the embossed portions comprise indicia.

30. The multilayer film of claim 1 or 2, wherein the film is a component of a card.

31. The multilayer film of claim 1 or 2, wherein the film comprises microperforations.

32. The multilayer film of claim 1 or 2, wherein the film deforms in response to heat to prevent tampering.

33. The multilayer film of claim 1 or 2, wherein the film internally delaminates to provide an indication of tampering.

34. The multilayer film of claim 1 or 2, wherein the lower reflection band edges of the s- and p-polarized light transmitted by the film at an angle greater than the shift angle are separated by less than 20 nm.

35. The multilayer film of claim 34, wherein the lower reflection band edges of the s- and p-polarized light transmitted by the film at an angle greater than the shift angle are separated by less than 10 nm.

36. The multilayer film of claim 34, wherein the lower band edges of the s- and p-polarized light transmitted by the film at an angle greater than the shift angle are substantially coincident.

37. The multilayer film of claim 1 or 2, wherein the F-ratio of the birefringent layer is less than 0.5.

38. The multilayer film of claim 37, wherein the F-ratio of the birefringent layer is less than 0.35.

39. The multilayer film of claim 37, wherein the F-ratio of the birefringent layer is approximately 0.25.

* * * * *